United States Patent [19]

Seraji

[11] Patent Number: 5,049,796
[45] Date of Patent: Sep. 17, 1991

[54] ROBUST HIGH-PERFORMANCE CONTROL FOR ROBOTIC MANIPULATORS

[75] Inventor: Homayoun Seraji, La Crescenta, Calif.

[73] Assignee: The United States of America as represented by the Administrator of the National Aeronautics and Space Administration, Washington, D.C.

[21] Appl. No.: 353,411

[22] Filed: May 17, 1989

[51] Int. Cl.⁵ ............................................. G05B 19/42
[52] U.S. Cl. ............................ 318/568.1; 318/568.13; 318/568.18; 318/632; 364/192; 901/45
[58] Field of Search ................... 318/560–646; 364/474.01–474.37, 513, 192, 190, 191, 193; 901/9, 13, 15, 19–24, 45

[56] References Cited

U.S. PATENT DOCUMENTS

| | | | |
|---|---|---|---|
| 3,758,762 | 9/1973 | Littman et al. ................... | 318/561 X |
| 4,200,827 | 4/1980 | Oswald ............................... | 318/561 |
| 4,341,986 | 7/1982 | Browder ............................. | 318/561 |
| 4,347,578 | 8/1982 | Inaba .......................... | 318/568.13 X |
| 4,362,977 | 12/1982 | Evans et al. ....................... | 318/632 X |
| 4,458,321 | 7/1984 | Whitney et al. .................. | 364/192 X |
| 4,540,923 | 9/1985 | Kade et al. ....................... | 318/631 X |
| 4,546,426 | 10/1985 | Hafner et al. ....................... | 364/561 |
| 4,546,443 | 10/1985 | Oguchi et al. ............... | 318/568.18 X |
| 4,547,858 | 10/1985 | Horak .................................. | 364/568 |
| 4,563,735 | 1/1986 | Hiroi et al. ........................ | 364/165 |
| 4,603,284 | 7/1986 | Perzley .............................. | 318/568 |
| 4,621,332 | 11/1986 | Sugimoto et al. .................. | 901/9 X |
| 4,639,652 | 1/1987 | Takahashi et al. .................. | 318/568 |
| 4,663,703 | 5/1987 | Axelby et al. ........................ | 364/149 |
| 4,670,843 | 6/1987 | Matsumura et al. ............. | 364/424.1 |
| 4,679,136 | 7/1987 | Shigemasa ............................ | 364/150 |
| 4,719,561 | 1/1988 | Shigemasa ............................ | 364/148 |
| 4,725,942 | 2/1988 | Osaka ................................. | 901/45 X |
| 4,733,149 | 3/1988 | Culberson ............................ | 318/561 |
| 4,763,276 | 8/1988 | Perreirra et al. ..................... | 364/513 |
| 4,773,025 | 9/1988 | Penkar et al. ........................ | 364/513 |
| 4,792,737 | 12/1988 | Goff et al. ....................... | 318/616 X |
| 4,860,215 | 8/1989 | Seraji ................................ | 901/45 X |

Primary Examiner—Paul Ip
Attorney, Agent, or Firm—Thomas H. Jones; Harold W. Adams; John R. Manning

[57] ABSTRACT

Model-based and performance-based control techniques are combined for an electrical robotic control system. Thus, two distinct and separate design philosophies have been merged into a single control system having a control law formulation including two distinct and separate components, each of which yields a respective signal component that is combined into a total command signal for the system. Those two separate system components include a feedforward controller and a feedback controller. The feedforward controller is model-based and contains any known part of the manipulator dynamics that can be used for on-line control to produce a nominal feedforward component of the system's control signal. The feedback controller is performance-based and consists of a simple adaptive PID controller which generates an adaptive control signal to complement the nominal feedforward signal.

19 Claims, 14 Drawing Sheets

Desired (dashed) and Actual (solid) Trajectories of the Joint Angle $\theta_1(t)$ Desired (dashed) and Actual (solid) Trajectories of the Joint Angle $\theta_2(t)$ Variation of the Tracking-Error $e_1(t)$ Variation of the Tracking-Error $e_2(t)$ Variation of the Control Torque $T_1(t)$ Variation of the Control Torque $T_2(t)$ Variations of the Auxiliary Signals $f_1(t)$ and $f_2(t)$ (dashed)

Variations of the Position Gains $k_{p1}(t)$ (solid) and $k_{p2}(t)$ (dashed)

FIG.7iii
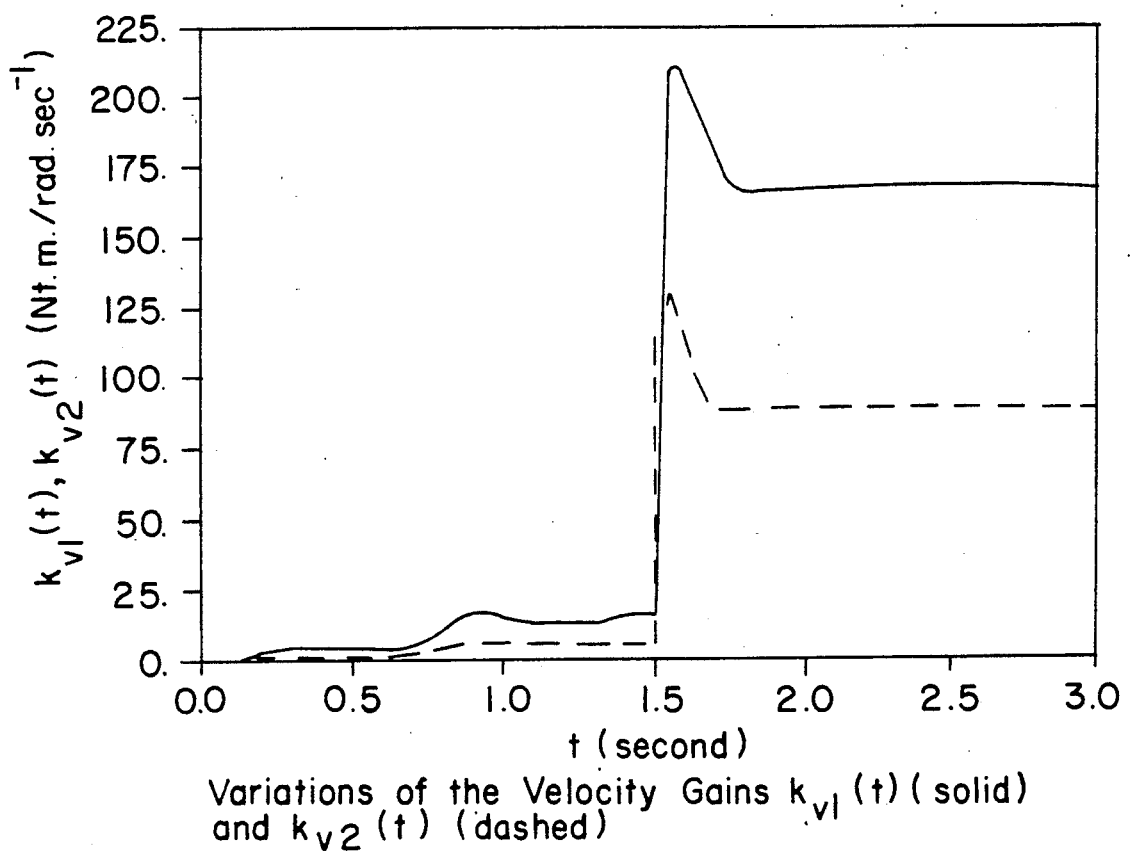
Variations of the Velocity Gains $k_{v1}(t)$ (solid) and $k_{v2}(t)$ (dashed)

Desired (dashed) and Actual (solid) PUMA Waist Angles under Adaptive Controller

Waist Tracking-Error under Adaptive Controller

Desired (dashed) and Actual (solid) PUMA Waist Angles under Unimation Controller Waist Tracking-Error under Unimation Controller Variation of the Auxiliary Signal f(t)

Variation of the Position Gain $k_p(t)$

FIG. 11 iii
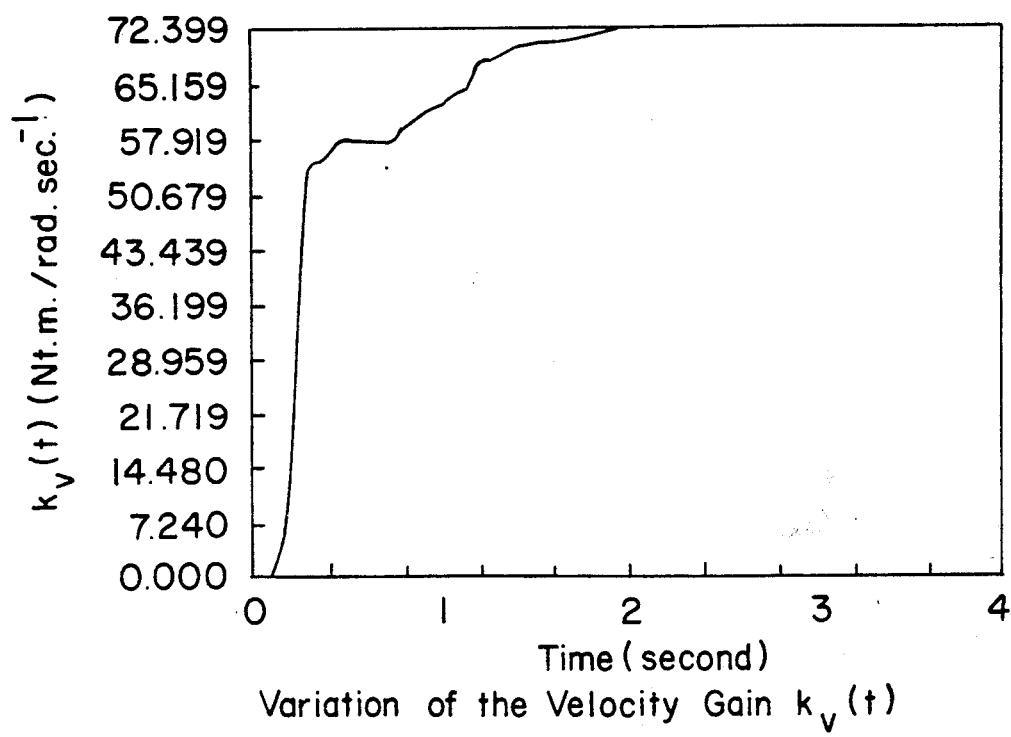
Variation of the Velocity Gain $k_v(t)$
FIG. 11 iv
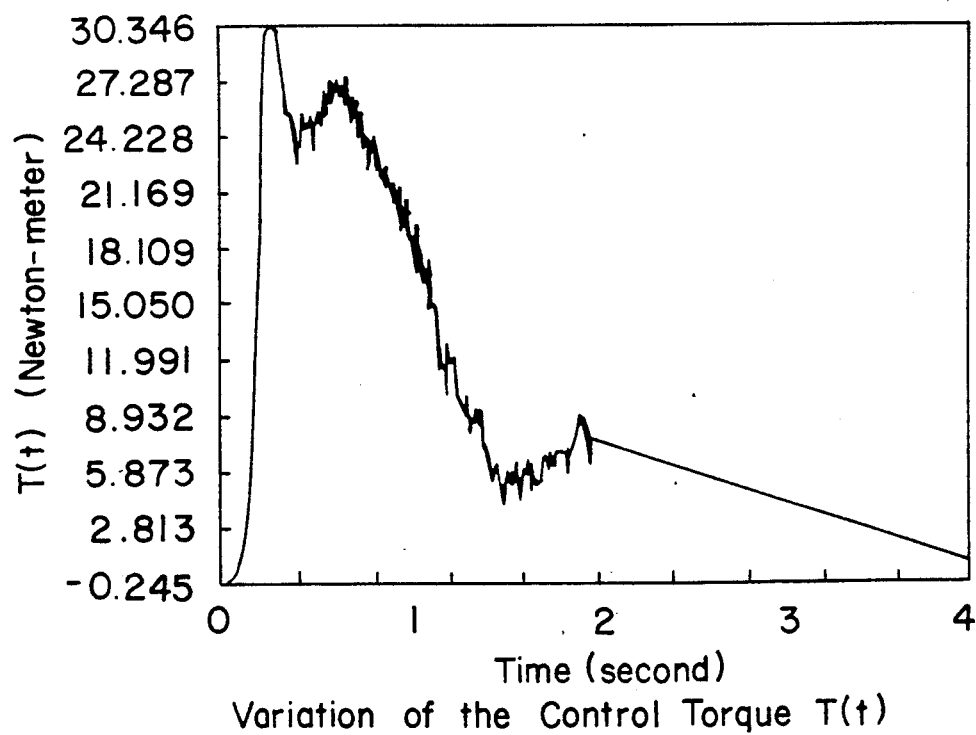
Variation of the Control Torque $T(t)$ Desired (dashed) and Actual (solid) Waist Angle with Arm Configuration Change Waist Tracking-Error with Arm Configuration Change

ROBUST HIGH-PERFORMANCE CONTROL FOR ROBOTIC MANIPULATORS

BACKGROUND OF THE INVENTION

1. Origin of the Invention

The invention described herein was made in the performance of the work under a NASA Contract and is subject to the provisions of Public Law 96517 (35 USC 202) in which the contractor has elected not to retain title.

2. Field of the Invention

This invention relates to control systems for controlling robotic manipulators.

3. Description of the Prior Art

The next generation of robotic manipulators will perform high-precision tasks in partially unknown and unstructure environments. These tasks require precise motion control of the manipulator under unknown and varying payloads. These requirements are far beyond the capabilities of present-day industrial robot controllers, and demand robust high-performance manipulator control systems. The need for advanced manipulator control systems to accomplish accurate trajectory tracking has therefore been recognized for some time, and two parallel lines of research have been pursued. The primary outcome of such research is the development of two classes of advanced manipulator control schemes, namely model-based and performance-based techniques.

Model-based techniques, such as the Computed Torque Method by B. R. Markiewicz: *Analysis Of The Computed Torque Drive Method And Comparison With Conventional Position Servo For A Computer-Controlled Manipulator,* Technical Memorandum 33-601, Jet Propulsion Laboratory, 1973, are based on cancellation of the nonlinear terms in the manipulator dynamic model by the controller. This cancellation is contingent on two assumptions which are not often readily met in practice. First, the values of all parameters appearing in the manipulator dynamic model, such as payload mass and friction coefficients, must be known accurately. Second, the full dynamic model of the manipulator needs to be known and computed on-line in real-time at the servo control rate. Performance-based techniques, such as the direct adaptive control method by S. Dubowsky and D. T. DesForges: *The Application Of Model-Referenced Adaptive Control To Robotic Manipulators,* ASME Journal of Dynamic Systems, Measurement and Control, Vol. 101, pp. 193-200, 1979, attempt to overcome these limitations by adjusting the controller gains on-line in real-time, based on the tracking performance of the manipulator; and, thus, eliminating the need for the manipulator model. Therefore, the indentification of the manipulator and payload parameters of the complex manipulator dynamic model is not necessary, and hence a fast adaptation can be achieved. Adaptive control methods, however, may become unstable for high adaptation rates and treat the manipulator as a "black-box" by not utilizing any part of the manipulator dynamics in the control law formulation.

During the past few years, several attempts have been made to combine the model-based and performance-based techniques in order to take full advantage of the merits of both techniques and overcome their limitations. For instance, in the approach of J. J. Craig, P. Hsu, and S. S. Sastry: *Adaptive Control Of Mechanical Manipulators,* Proc. IEEE Intern. Conf. on Robotics and Automation, Vol. 1, pp. 190-195, San Francisco, 1986, and R. H. Middleton and G. C. Goodwin: *Adaptive Computed Torque Control For Rigid Link Manipulators,* Proc. IEEE Conf. on Decision and Control, Vol. 1, pp. 68-73, Athens, 1986, the manipulator parameters are estimated adaptively first and are then utilized in a dynamic-based control law.

First attention is directed to Oswald U.S. Pat. No. 4,200,827 which discloses a control system for a magnetic head including both velocity and position feedback and feedforward signals representing both velocity and acceleration. See FIG. 1 and column 3, line 17 to column 6, line 35. Also, see Penkar et al. U.S. Pat. No. 4,773,025 and Axelby U.S. Pat. No. 4,663,703.

Next attention is directed to Takahashi U.S. Pat. No. 4,639,652 which discloses a control system for a robot manipulator including adaptive position and velocity feedback gains. See gain adjuster 14 and gains 5 and 6 in FIG. 1. Particular attention should be given to the circuit diagram presented in FIG. 4 of this reference which differs from FIG. 1 only in the use of the transfer function T(s) and operates in accordance with the description beginning at column 4, line 48 through column 6, line 29. This reference is of interest only because of the high speed positioning control. It relies upon a prior art technique commonly known as "Identification", in that test runs permit the gains of its control law to be identified.

Next attention is directed to Shigemasa U.S. Pat. No. 4,719,561 which discloses a control system having robust controller 24 in combination with a PID controller 22. See FIG. 3 and column 5, line 13.

The following references all disclose a control system for a robot manipulator.

| | |
|---|---|
| Browder | 4,341,986 |
| Hafner | 4,546,426 |
| Horak | 4,547,858 |
| Perzley | 4,603,284 |
| Perreirra et al. | 4,763,276 |

The following references are cited as of interest.

| | |
|---|---|
| Littman et al. | 3,758,762 |
| Hiroi et al. | 4,563,735 |
| Matsumura et al. | 4,670,843 |
| Shigemasa | 4,679,136 |

In contrast to the Computed Torque Method of the prior art, the invention does not rely on an accurate dynamic model in order to control the manipulator. Furthermore, global asymptotic stability of the control system is assured since the feedback adaptation laws are derived from a Lyapunov analysis, and the feedforward controller is outside the servo control loop.

A new, robust control system using a known part of the manipulator's dynamics in a freeforward control circuit and any unknown dynamics and uncertainties and/or variations in the manipulator/payload parameters is accounted for in an adaptive feedback control loop.

SUMMARY OF THE INVENTION

This invention discloses and claims a novel approach of combining model-based and performance-based control techniques. Two distinct and separate design philosophies have been merged into one novel control system. The invention's control law formulation is comprised of two distinct and separate components, each of which yields a respective signal component that is combined into a total command signal for the system.

These two separate system components include a feedforward controller and a feedback controller. The feedforward controller is model-based and contains any known part of the manipulator dynamics that can be used for on-line control to produce a nominal feedforward component of the system's command signal. The feedback controller is performance-based and consists of a simple adaptive PID controller which generates an adaptive control signal to complement the nominal feedforward signal. The feedback adaptation laws are very simple, allowing a fast servo control loop implementation.

BRIEF SUMMARY OF THE FIGURES OF THE DRAWING

FIG. 4(ii) is a figure depicting the desired [dashed] and actual [solid] trajectories of the joint angle $\theta_2(t)$ in accordance with the invention;

FIG. 5(ii) is a figure depicting the variation of the tracking—error $e_1(t)$ in accordance with the invention;

FIG. 6(ii) is a figure depicting the variation of the control torque $T_2(t)$ in accordance with the invention;

FIG. 7(ii) is a figure depicting the variations of the position gains $k_p^1(t)$ [solid] and $k_p^2(t)$ [dashed] in accordance with the invention;

FIG. 7(iii) is a figure depicting the variations of the velocity gains $k_v^1(t)$ [solid] and $k_v^2(t)$ [dashed] in accordance with the invention;

FIG. 9(ii) is a figure depicting the waist tracking-error under adaptive controller in accordance with the invention;

FIG. 10(ii) is a figure depicting the waist tracking-error under unimation controller in accordance with the invention;

FIG. 11(ii) is a figure depicting the variation of the position gain $k_p(t)$ in accordance with the invention;

FIG. 11(iii) is a figure depicting the variation of the velocity gain $k_v(t)$ in accordance with the invention;

FIG. 11(iv) is a figure depicting the variation of the control torque T(t) in accordance with the invention;

FIG. 12(i) is a figure depicting the desired [dashed] and actual [solid] waist angles with arm configuration charge in accordance with the invention.

DESCRIPTION OF THE PREFERRED EMBODIMENT

1. Summary Of Presentation

The presentation of the invention is structured as follows. In Section 2, the integrated dynamic model of a manipulator and actuator system is derived. The tracking control scheme is described fully in Section 3. In Section 4, the digital control implementation of the scheme is given. The issue of robustness is discussed in Section 5. The control scheme is applied in Section 6 to the model of a two-link arm, and extensive simulation results are given to support the method. In Section 7, the implementation of the proposed control scheme on a PUMA industrial robot is described and experimental results are presented to validate the improved performance of the invention. Section 8 discusses the results and concludes the presentation of the description of the invention.

2. Integrated Dynamic Model of Manipulator-Plus-Actuator System

Most papers on manipulator control neglect the dynamics of joint actuators, and treat the joint torques as the driving signals. In this section, a realistic approach is taken by including the actuator dynamics and modeling the manipulator and actuators as an integrated system.

In many industrial robots such as the Unimation PUMA, the links of the manipulator are driven by electric actuators at the corresponding joints, and the dynamics of the joint actuators must be taken into account. Note that although electric actuators are modeled hereinafter, the results are general since the form of dynamic equations for other types of actuators is essentially the same.

Figure 1:
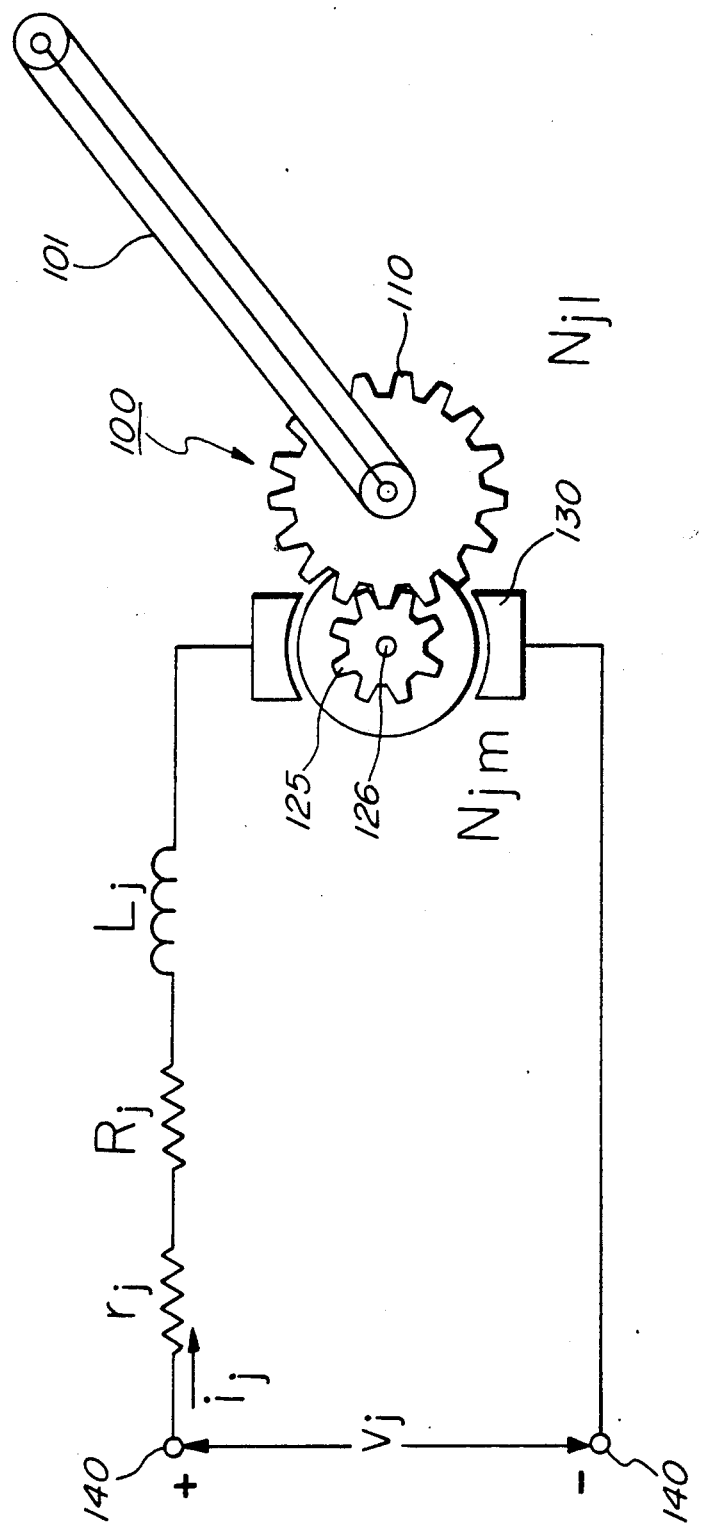
FIG. 1 is a figure depicting a schematic diagram of a typical actuator and link assembly in accordance with the invention.

Referring to FIG. 1, each actuator 100 may be considered as comprising a link 101, driven by a gear 110 that meshes with a motor-driven drive gear 125. Many such actuators are generally required for any given robotics application. A single actuator as a general case will be presented in this application for simplicity purposes. It should be understood that several actuators as needed are driven by the command signal as developed by the control system of this invention.

Any typical actuator is basically a DC servomotor with a permanent magnet 130 to provide the motor field and the driving signal is a voltage or a current applied to the armature winding. In FIG. 1, a driving voltage identified simply as $V_j$ is impressed across a pair of input terminals 140. The resistance and inductance shown in the FIG. simply represent the internal parameters typically found in any actuator and such matters are well known in the art and require no further description. Since servomotors are inherently high-speed low-torque devices, the gear assembly 110,125 is often required to mechanically couple the armature shaft 126 to the robot link 110 in order to obtain speed reduction and torque magnification.

Consider now the jth actuator 100 and suppose that the armature is voltage-driven, as shown in FIG. 1. This representation is general because in cases where the armature is current-driven using the current source i(t) with shunt resistance $R_c$, the driving source can be replaced by the voltage source $v(t)=R_c i(t)$ with series resistance $$R_v = \frac{1}{R_c}.$$

Therefore, without loss of generality, we can assume that the driving source of the jth joint motor is always the voltage source $v_j(t)$ with the internal resistance $r_j$. This source produces the current $i_j(t)$ in the armature circuit; and the electrical equation for the jth actuator can be written as $$J_j J_{jm} + \left[\frac{N_{jm}}{N_{jl}}\right]^2 J_{jl} = J_{jm} + (N_j)^2 J_{jl} \qquad (2)$$

$$f_j = f_{jm} + \left[\frac{N_{jm}}{N_{jl}}\right]^2 f_{jl} = f_{jm} + (N_j)^2 f_{jl}. \qquad (3)$$

where $R_j$ and $L_j$ are the resistance and inductance of the jth armature winding, $\phi_j(t)$ is the angular displacement of the jth armature shaft, and the term $$K_{bj}\frac{d\phi_j(t)}{dt}$$

is due to the back-emf generated in the armature circuit. Let us now consider the mechanical equation of the actuator. Referring to the armature shaft, the "equivalent" moment of inertia and friction coefficient of the total load are given by K. Ogata: *Modern Control Engineering*, Prentice Hall Inc., N.J., 1970

$$v_j(t) = r_j i_j(t) + R_j i_j(t) + L_j \frac{d}{dt}[i_j(t)] + K_{bj}\frac{d}{dt}[\phi_j(t)] \qquad (1)$$

where $\{J_{jm},f_{jm}\}$ and $\{J_{jl},f_{jl}\}$ are the moments of inertia and friction coefficients of the jth motor shaft and the jth robot link respectively, while $N_{jm}$ and $N_j$ are the numbers of gear teeth on the motor side and on the link side respectively, and $$N_j = \frac{N_{jm}}{N_{jl}} < 1$$

is the gear ratio. Although it is assumed that there is one gear mesh between the motor and the link, the result can be extended to multi-mesh gear trains in a trivial manner. See K. Ogata: *Modern Control Engineering*, Prentice Hall Inc., N.J., 1970. Equations (2) and (3) indicate that, as seen by the motor shaft, the link inertia and friction are reduced by a factor of $(N_j)^2$. Now, the torque $r_j(t)$ generated by the jth servomotor is proportional to the armature current $i_j(t)$; that is, $r_j(t)=K_{aj}i_j(t)$, and will cause rotation of the armature shaft by $\phi_j(t)$. In addition, the armature will exert an "effective" torque $T_j(t)$ on the jth robot link through the gear train. Thus, the mechanical equation for the jth actuator can be expressed as (refer to K. Ogata, supra)

$$J_j\frac{d^2\phi_j(t)}{dt^2} + f_j\frac{d\phi_j(t)}{dt} + N_j T_j(t) = r_j(t) \qquad (4)$$

Let us now denote the angular displacement of the jth robot joint by $\theta_j(t)$, where $$\theta_j(t) = N_j\phi_j(t) \qquad (5)$$

due to the gear train. Then, (1) and (4) can be written in terms of $\theta_j(t)$ as $$v_j(t) = (r_j + R_j)i_j(t) + L_j\frac{di_j(t)}{dt} + \frac{1}{N_j}K_{bj}\frac{d\theta_j(t)}{dt} \qquad (6)$$

$$r_j(t) = K_{aj}i_j(t) = \frac{J_j}{N_j}\frac{d^2\theta_j(t)}{dt^2} + \frac{f_j}{N_j}\frac{d\theta_j(t)}{dt} + N_j T_j(t) \qquad (7)$$

Eliminating the armature current $i_j(t)$ between (6) and (7), the dynamic model of the jth actuator can be described by the third order differential equation $$\left[\frac{L_j J_j}{K_{aj} N_j}\right]\frac{d^3\theta_j}{dt^3} + \left[\frac{(r_j + R_j)J_j + L_j f_j}{K_{aj} N_j}\right]\frac{d^2\theta_j}{dt^2} + \qquad (8)$$

$$\left[\frac{(r_j + R_j)f_j + K_{bj}K_{aj}}{K_{aj} N_j}\right]\frac{d\theta_j}{dt} + \left[\frac{L_j N_j}{K_{aj}}\right]\frac{dT_j}{dt} +$$

$$\left[\frac{(r_j + R_j)N_j}{K_{aj}}\right]T_j = v_j$$

Consequently, for an n-jointed robot, the n joint actuators as a whole can be represented by the (3n)th order vector differential equation $$A\ddot{\theta}(t) + B\ddot{\theta}(t) + C\dot{\theta}(t) + D\dot{T}(t) + ET(t) = V(t) \qquad (9)$$

where V(t), $\theta$(t) and T(t) are $n \times 1$ vectors and the $n \times n$ diagonal matrices in (9) are defined by $$A_{jj} = \left[\frac{L_j J_j}{K_{aj} N_j}\right];$$

$$B_{jj} = \left[\frac{(r_j + R_j)J_j + L_j f_j}{K_{aj} N_j}\right]$$

$$C_{jj} = \left[\frac{(r + R_j)f_j + K_{bj}K_{aj}}{K_{aj} N_j}\right];$$

$$D_{jj} = \left[\frac{L_j N_j}{K_{aj}}\right];$$

$$E_{jj} = \left[\frac{(r_j + R_j)N_j}{K_{aj}}\right]$$

In a typical DC servomotor, the inductance of the armature winding is in the order of tenths of millihenries, while its resistance is in the order of a few ohms. Refer to J. Y. S. Luh: *Conventional Controller Design For Industrial Robots—A Tutorial*, IEEE Trans. Systems, Man and Cybernetics, SMC 13(3), pp. 298-316, 1983. Thus, the inductances $L_j$ can safely be neglected ($L_j \approx 0$) and in this case the actuator model (9) reduces (2n)th order model $$\bar{G}\theta(t) + C\dot{\theta}(t) + ET(t) = V(t) \quad (10)$$

where $$G_{jj} = \left[ \frac{(r_j + R_j)J_j}{K_{aj}N_j} \right].$$

It is seen that the approximation $L_j \approx 0$ has resulted in $A = D = 0$, hence a decrease in the order of the model from 3n to 2n.

Now that the joint actuators have been modeled, we shall consider the manipulator dynamics. In general, the dynamic model of an n-jointed manipulator which relates the $n \times 1$ "effective" joint torque vector T(t) to the $n \times 1$ joint angle vector $\theta(t)$ can be written as (See J. J. Craig: *Robotics—Mechanics and Control*, Addison Wesley Publishing Company, Reading, Mass., 1986).

$$M^*(m,\theta)\bar{\theta} + N^*(m,\theta,\dot{\theta}) = T \quad (11)$$

where m is the payload mass, $M^*(m,\theta)$ is the symmetric positive-definite $n \times n$ inertia matrix, $N^*(m,\theta,\dot{\theta})$ is the $n \times 1$ vector representing the total torque due to Coriolis and centrifugal term, gravity loading term, and frictional term. The elements of $M^*$ and $N^*$ are highly complex nonlinear functions which depend on the manipulator configuration $\theta$, the speed of the motion $\dot{\theta}$, and the payload mass m. On combining (10) and (11), we obtain the integrated dynamic model of the manipulator-plus-actuator system as $$M(m,\theta)\bar{\theta} + N(m,\theta,\dot{\theta}) = V \quad (12)$$

where the terms in (12) are defined as $$M(m,\theta) = G + EM^*(m,\theta);$$
$$N(m,\theta,\dot{\theta}) = C\dot{\theta} + EN^*(m,\theta,\dot{\theta})$$

Equation (12) represents a (2n)th order coupled nonlinear system with the $n \times 1$ input vector V(t) of the armature voltages and the $n \times 1$ output vector $\theta(t)$ of the joint angles.

Although the manipulator dynamic model (11) and the integrated system model (12) are both of order (2n), it is important to note that the integrated model (12) is a more accurate representation of the system than the manipulator model (11), which does not include the actuator dynamics. This is due to the following considerations:

(i) Electrical Parameters: The main contribution from the electrical part of the joint actuators to the integrated system dynamics is the back-emf term $K_b\dot{\theta}(t)$ in (6). This term can have a significant effect on the robot performance when the speed of motion $\dot{\theta}(t)$ is high. Note that the back-emf appears as an internal damping term, contributing to the coefficient of $\dot{\theta}(t)$ in (12). The other electrical parameter is the armature resistance R which appears in (6) and converts the applied armature voltage v(t) to the current i(t) and in turn to the driving torque T(t).

(ii) Mechanical Parameters. The major contribution from the mechanical part of the joint actuators to the robot performance is due to the gear ratios $N_j[<1]$ of the gear trains coupling the motor shafts to the robot links. As seen from (4), the "effective" driving torque on the jth link is reduced by a factor of $N_j$ as seen by the jth joint actuator. In addition, from (2) and (3), the moments of inertia and friction coefficients of the jth link are also reduced by a factor of $(N_j)^2$ as seen by the motor shaft. This implies that the mechanical parameters of joint motors, namely the motor shaft inertia and friction, can have a significant effect on the overall system performance; particularly in robots with large gear ratios such as PUMA 560 where $N_j$ is typically, 1:100.

3. Tracking Control Scheme

Given the integrated dynamic model of the manipulator-plus-actuator system as $$M(m,\theta)\bar{\theta} + N(m,\theta,\dot{\theta}) = V \quad (13)$$

The tracking control problem is to devise a control system which generates the appropriate armature voltages V(t) so as to ensure that the joint angles $\theta(t)$ follow any specified reference trajectories $\theta_r(t)$ as closely as possible, where $\theta_r(t)$ is an $n \times 1$ vector.

The intuitive solution to the tracking control problem is to employ the full dynamic model (13) in the control scheme in order to cancel out the nonlinear terms in (13). This approach is commonly known as the Computed Torque Technique (see B. R. Markiewicz, supra), and yields the control law $$V = M(m,\theta)[\bar{\theta}_r + K_v(\dot{\theta}_r - \dot{\theta}) + K_p(\theta_r - \theta)] + N(m,\theta,\dot{\theta}) \quad (14)$$

where $K_p$ and $K_v$ are constant diagonal $n \times n$ position and velocity feedback gain matrices. This results in the error differential equation $$\bar{e}(t) + K_v\dot{e}(t) + K_pe(t) = 0 \quad (15)$$

where $e(t) = \theta_r(t) - \theta(t)$ is the $n \times 1$ vector of position tracking-errors. When the diagonal elements of $K_p$ and $K_v$ are positive, (15) is stable; implying that $e(t) \to 0$ or $\theta(t) \to \theta_r(t)$ as $t \to \infty$, i.e. tracking is achieved. In the control law (14), we have implicitly made a few assumptions which are rarely true in practice. The major problem in implementing (14) is that the values of the parameters in the manipulator model (13) are often not known accurately. This is particularly true of the friction term and the payload mass. Another problem in implementation of (14) is that the entire dynamic model (13) of the manipulator must be computed on-line in real time. These computations are quite involved, and the computer expense may make the scheme economically unfeasible.

Figure 2:
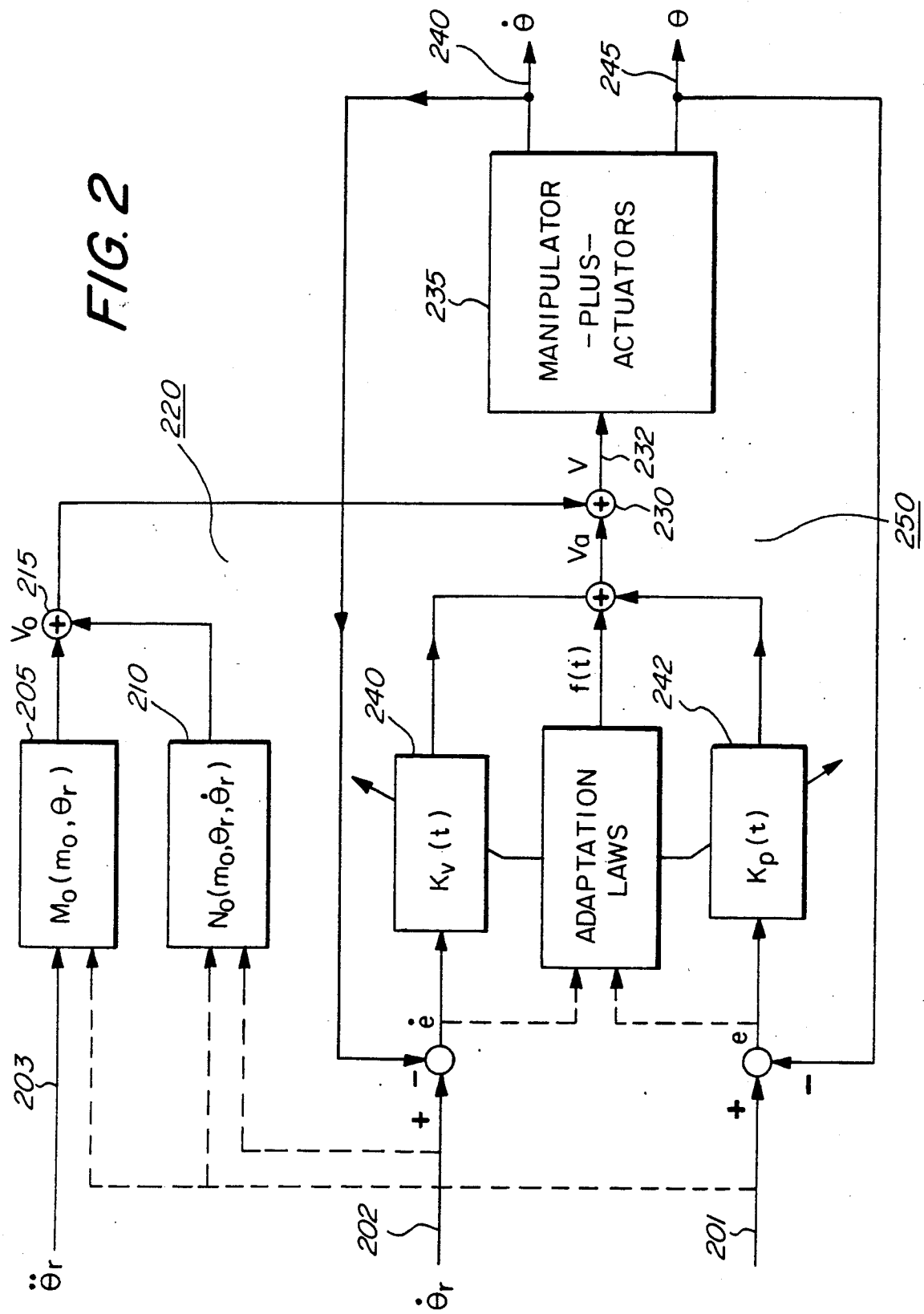
FIG. 2 is a figure depicting a feedforward/feedback tracking control scheme in accordance with the invention.

In an attempt to overcome the afore-mentioned limitations of the Computed Torque Technique, a new tracking control philosophy of the invention is proposed in this section. The underlying concept in this invention is that the full dynamic model is not required in order to achieve trajectory tracking and the lack of knowledge of full dynamics can readily be compensated for by the introduction of "adaptive elements" in the control system. Specifically, the proposed tracking control system, FIG. 2, is composed of two components: the nominal feedforward controller 220 and the adaptive feedback controller 250. In FIG. 2, the block 235 represents the manipulator plus actuators of the type generalized earlier herein. The output signals on leads 240 and 245 are the actual velocity and actual position of the system as sensed in any well known manner. Three separate input terms are depicted at leads 201, 202, and 203. The signals on these input leads represent, respectively, desired position ($\phi_r$) on lead 201, desired velocity ($\dot{\phi}_r$) on lead 202, and desired acceleration ($\ddot{\phi}_r$) on lead 203. The feedforward controller 220 contains computation elements 205 and 210. Computation elements 205 and 210 take the known information that is available about the manipulator/system and compute, based upon the input signals at leads 201, 202, or 203 the available partial information that is fed to a summing junction 215. The output from summing junction 215 is a signal $V_o$, which signal is in turn fed into another signal junction 230. The signal $V_o$ from junction 215 is the feedforward component of the total command signal V that is developed by the invention at lead 232 into the manipulator plus actuators 235. Since the feedforward loop 220 is model-based, any known information about the manipulators or the actuator system is input into the control loop. Data on the manipulator dynamics can be used for real-time control at the required sampling rate. Such information can be, for instance, only the gravity loading term or the manipulator full dynamics excluding the payload. The feedforward controller 220 is model-based and it acts on the desired joint trajectory $\theta_r(t)$ to produce the actuators driving voltage $V_o(t)$.

The role of the feedback controller 250 is to generate the corrective actuator voltage $V_a(t)$, based on the tracking-error e(t), that needs to be added to $V_o(t)$ to complement the feedforward controller. The feedback controller 250 is composed of adaptive position and velocity feedback terms and an auxiliary signal f(t). The feedback gains, $K_v(t)$ at element 240 and $K_p(t)$ element 242 are varied in accordance with an adaptation law that is described in greater detail hereinafter.

Suffice it to say at this point that the error terms and the desired terms for position and velocity are adapted to form an adaptation component, $V_a$, at junction 230 which is then combined with the feedforward component $V_o$ from loop 220 in order to yield the total command signal for the control system of this invention. Thus, the feedback loop 250 employs these stated signals which are updated continuously in real time to cope with the nonlinear nature of the system and uncertainties/variations in the manipulator parameters or payload. The feedforward and feedback controllers 220, 250 are now discussed separately in Sections 3.1 and 3.2.

3.1 Nominal Feedforward Controller

Suppose that some partial knowledge about the manipulator dynamic model (13) is available in the form of "approximations" to $\{M(m,\theta), N(m,\theta,\dot{\theta})\}$ denoted by $\{M_o(m_o,\theta_r), N_o(m_o,\theta_r,\dot{\theta}_r)\}$, where $m_o$ is an estimate of m. Note that $\{M_o,N_o\}$ are functions of the reference trajectory $\theta_r(t)$ instead of the actual trajectory $\theta(t)$. The information available in $M_o$ and $N_o$ can vary widely depending on the particular situation. For instance, we can have $M_o(m_o,\theta_r)=0$ and $N_o(m_o,\theta_r,\dot{\theta}_r)=G(m,\theta_r)$, where only gravity information is available. Likewise, it is possible to have $M_o(m_o,\theta_r)=M(0,\theta_r)$ and $N_o(m_o,\theta_r,\dot{\theta}_r)=N(0,\theta_r,\dot{\theta}_r)$, where no information about the payload is available. Furthermore, the matrices $M_o$ and $N_o$ may have either a "centralized" or a "decentralized" structure. In the centralized case, each element of $M_o$ and $N_o$ can be a function of all joint variables. In the "decentralized" case, $[M_o]_{ii}$ and $[N_o]_i$ are functions only of the ith joint variable and $]M_o]_{ij}=0$ for all $i \neq j$.

The nominal feedforward controller is described by $$V_o(t) = M_o(m_o,\theta_r)\ddot{\theta}_r(t) + N_o(m_o,\theta_r,\dot{\theta}_r) \quad (16)$$

where $V_o$ is the $n \times 1$ nominal control voltage vector and the controller operates on the reference trajectory $\theta_r(t)$ instead of the actual trajectory $\theta(t)$. It is important to realize that $M_o$ and $N_o$ are based solely on the information available on the manipulator dynamics which is used in the real-time control system of this invention. The controller matrices $\{M_o, N_o\}$ can therefore be largely different from the model matrices $\{M,N\}$ due to lack of complete information, or due to computational constraints. For instance, in some cases we may wish to discard some elements of M and N in order to reduce the on-line computational burden, even if the full knowledge of manipulator dynamics is available.

3.2 Adaptive Feedback Controller

In contrast to the feedforward controller 220, FIG. 2, the feedback controller 250 does not assume any a priori knowledge of the dynamic model or parameter values of the manipulator plus actuators 235. This controller 250 operates solely on the basis of the tracking performance of the manipulator through the tracking-error e(t). The controller 250 is adaptive and its gains are adjusted continuously in real-time by simple adaptation laws to ensure closed-loop stability and desired tracking performance. The on-line adaptation compensates for the changing dynamic characteristics of the manipulator due to variations in its configuration, speed, and payload.

The adaptive feedback controller is described by $$V_a(t) = f(t) + K_p(t)e(t) + K_v(t)\dot{e}(t) \quad (17)$$

where $V_a(t)$ is the $n \times 1$ adaptive control voltage vector, $e(t) = \theta_r(t) - \theta(t)$ is the $n \times 1$ position tracking-error vector, f(t) is an $n \times 1$ auxiliary signal generated by the adaptation scheme, and $\{K_p(t), K_v(t)\}$ are the $n \times n$ adjustable PD feedback gain matrices. The feedback control law (17) can be either "centralized" or "decentralized." For the centralized case, the controller adaptation laws are obtained as I have discussed in my paper entitled *A New Approach to Adaptive Control of Manipulators*, ASME Journal of Dynamic Systems, Measurement, and Control, Vol. 109, No. 3, pp. 193-202, 1987. For the decentralized control case, the gains $\{K_p(t), K_v(t)\}$ are diagonal matrices and their ith diagonal elements are obtained from the adaptation laws (21)-(24) with e(t) replaced by $e_i(t)$. See, for further explanation my paper H. Seraji: *Decentralized Adaptive Control of Manipulators: Theory, Simulation, and Experimentation*, IEEE Journal of Robotics and Automation, 1988, (to appear). The centralized case yields the controller adaptation laws as $$f(t) = \gamma_1 \dot{r}(t) + \gamma_2 r(t) \quad (18)$$

$$\dot{K}_p(t) = \alpha_1 \frac{d}{dt}[r(t)e'(t)] + \alpha_2[r(t)e'(t)] \quad (19)$$

$$\dot{K}_v(t) = \beta_1 \frac{d}{dt}[r(t)\dot{e}'(t)] + \beta_2[r(t)\dot{e}'(t)] \quad (20)$$

where the prime denotes transposition, and r(t) is the n×1 vector of "weighted" position-velocity error defined as $$r(t) = W_p e(t) + W_v \dot{e}(t) \tag{21}$$

In (18)-(21), $\{\gamma_1, \alpha_1, \beta_1\}$ are zero or positive proportional adaptation gains, $\{\gamma_2, \alpha_2, \beta_2\}$ are positive integral adaptation gains, and $W_p = \text{diag}_i(w_{pi})$ and $w_v = \text{diag}_i(w_{vi})$ are constant n×n matrices which contain the position and velocity weighting factors for all joints. Integrating (18)-(20) in the time interval [0,t], one obtains $$f(t) - f(0) = \gamma_1[r(t) - r(0)] + \gamma_2 \int_0^t r(t)dt$$

$$K_p(t) - K_p(0) = \alpha_1[r(t)e'(t) - r(0)e'(0)] + \alpha_2 \int_0^t r(t)e'(t)dt$$

$$K_v(t) - K_v(0) = \beta_1[r(t)\dot{e}'(t) - r(0)\dot{e}'(0)] + \beta_2 \int_0^t r(t)\dot{e}'(t)dt$$

Since the initial values of the reference and actual trajectories are the same, we have $e(0) = \dot{e}(0) = r(0) = 0$. This yields the Proportional+Integral (P+I) adaptation laws $$f(t) = f(0) + \gamma_1 r(t) + \gamma_2 \int_0^t r(t)dt \tag{22}$$

$$K_p(t) = K_p(0) + \alpha_1 r(t)e'(t) + \alpha_2 \int_0^t r(t)e'(t)dt \tag{23}$$

$$K_v(t) = K_v(0) + \beta_1 r(t)\dot{e}'(t) + \beta_2 \int_0^t r(t)\dot{e}'(t)dt \tag{24}$$

It is noted that the choice of $\{W_p, W_v\}$ affects all adaptation rates in (22)-(24) simultaneously; whereas the adaptation rate for each term $\{f(t), K_p(t), K_v(t)\}$ can be affected individually by the selection of $\{\gamma_i, \alpha_i, \beta_i\}$ independently. The proportional terms in the adaptation laws (22)-(24) act to increase the rate of convergence of the tracking-error e(t) to zero. The use of P+I adaptation laws also yields increased flexibility in the design, in accordance with the features of the invention, by providing a larger family of adaptation schemes than obtained by the conventional I adaptation laws.

The physical interpretation of the auxiliary signal is obtained by substituting from (21) into (22) to yield $$\begin{aligned}f(t) &= f(0) + \gamma_1[W_p e(t) + W_v \dot{e}(t)] + \gamma_2 \int_0^t [W_p e(t) + W_v \dot{e}(t)]dt \\ &= f(0) + [\gamma_1 W_p + \gamma_2 W_v]e(t) + [\gamma_2 W_p]\int_0^t e(t)dt + [\gamma_1 W_v]\dot{e}(t)\end{aligned} \tag{25}$$

Hence, f(t) can be generated by a PID controller with fixed gains acting on the tracking-error e(t). Thus, the feedback controller (17) can be represented by the PID control law $$V_a(t) = f(0) + K_p^*(t)e(t) + K_v^* (t)\dot{e}(t) + K_I^* \int_0^t e(t)dt \tag{26}$$

where $$K_p^*(t) = K_p(t) + \gamma_1 W_p + \gamma_2 W_v; \quad K_v^*(t) = K_v(t) + \gamma_1 W_v \\ K_I^* = \gamma_2 W_p \tag{27}$$

It is seen that the feedback controller 250 as defined in accordance with equation (26) is composed of three terms which are effective during the initial, intermediate, and final phases of motion:

(i) The initial auxiliary signal f(0) can be chosen to overcome the stiction (static friction) and compensate for the initial gravity loading. This term improves the responses of the joint angles during the initial phase of motion.

(ii) The adaptive-gain PD term $K_p^*(t)e(t) + K_v^*(t)\dot{e}(t)$ is responsible for the tracking performance during gross motion while the manipulator model is highly nonlinear; i.e., the changes of $\theta(t)$ and $\dot{\theta}(t)$ are large. Each gain consists of a fixed part and an adaptive part. The online gain adaptation is necessary in order to compensate for the changing dynamics during the intermediate phase of motion.

(iii) The fixed-gain I term $$K_I^* \int_0^t e(t)dt$$

takes care of the fine motion in the steady-state, while the changes of $\theta(t)$ and $\dot{\theta}(t)$ are small and the manipulator model is approximately linear. Thus the I term contributes during the final phase of motion.

3.3 Total Control System of the Invention

The total control system is obtained by combining the nominal feedforward controller 220 operating in accordance with equation (16) and the adaptive feedback controller 250 operating in accordance with equation (17) as shown in FIG. 2 to yield the control law $$\begin{aligned}V(t) &= V_o(t) + V_a(t) \\ &= [M_o(m_o, \theta_r)\ddot{\theta}_r + N_o(m_o, \theta_r, \dot{\theta}_r)] + [f(t) + K_p(t)e(t) + K_v(t)\dot{e}(t)]\end{aligned} \tag{28}$$

where V is the total voltage applied at the actuators. It is important to note that in this control configuration, closed-loop stability is not affected by the feedforward controller.

I shall now discuss two extreme cases:

Case i: UNKNOWN MANIPULATOR MODEL

When no a priori information is available on the manipulator dynamic model, that is $M_o = N_o = 0$, the feedforward controller has no contribution, i.e. $v_o(t) = 0$. In this case, the control system approach reduces to the adaptive feedback control law $$V(t) = f(t) + K_p(t)e(t) + K_v(t)\dot{e}(t) \tag{29}$$

which can be implemented with a high sampling rate.

Case ii: FULL MANIPULATOR MODEL

When the full dynamic model and accurate parameter values of the manipulator, actuators and payload are available for on-line control, that is $M_o = M$ and $N_o = N$, the feedforward controller can generate the required actuator voltage $V_o(t)$. In this case, the adaptation process can be switched off and the feedback controller reduces to a fixed-gain PD controller $\{K_p(0), V_v v(0)\}$. The control law is now given by $$V(t) = M(m, \theta_r)\ddot{\theta}_r + N(m, \theta_r, \dot{\theta}_r) + K_p(0)e(t) + K_v(0)\dot{e}(t) \quad (30)$$

which is the feedforward version of the Computed Torque Technique. See, for example, P. K. Khosla and T. Kanade: *Experimental Evaluation of Nonlinear Feedback and Feedforward Control Schemes For Manipulators,* Intern. Journ. of Robotics Research, Vol. 7, No. 1, pp. 18-28, 1988.

I have concluded that there is a trade-off between the availability of a full dynamic model and the controller adaptation process. In the range of possible operation, one can go from one extreme of no model knowledge and fully adaptive controller, to the other extreme of full model knowledge and non-adaptive controller.

4. Digital Control Algorithm

In Section 3, it is assumed that the control action is generated and applied to the manipulator in continuous time. In practical implementations, however, manipulators are controlled by means of digital computers in discrete time. In other words, the computer receives the measured data (joint positions $\theta$) and transmits the control signal (actuator voltages V) ever $T_s$ seconds, where $T_s$ is the sampling period. It is therefore necessary to reformulate the manipulator control problem in discrete time from the outset. In practice, however, the sampling period $T_s$ is often sufficiently small to allow us to treat the manipulator as a continuous system and discretize the continuous control law to obtain a digital control algorithm. This approach is feasible for the invention, since the on-line computations involved for real-time control are very small; allowing high rate sampling to be implemented.

In order to discretize the control law, let us consider the adaptation laws (18)-(20) for the feedback controller and integrate them in the time interval $[(N-1)T_s, NT_s]$ to obtain $$f(n) = f(N-1) + \gamma_1[r(N) - r(N-1)] +$$

$$\gamma_2 \cdot \frac{T_s}{2}[r(N) + r(N-1)]$$

$$K_p(N) = K_p(N-1) + \alpha_1[r(N)e'(N) - r(N-1)e'(N-1)] +$$

$$\alpha_2 \cdot \frac{T_s}{2}[r(N)e'(N) + r(N-1)e'(N-1)]$$

$$K_v(N) = K_v(N-1) + \beta_1[r(N)\dot{e}'(N) - r(N-1)\dot{e}'(N-1)] +$$

$$\beta_2 \cdot \frac{T_s}{2}[r(N)\dot{e}'(N) + r(N-1)\dot{e}'(N-1)]$$

where N and N−1 denote the sample instants and refer to $t = NT_s$ and $t = (N-1)T_s$, $e(N) = \theta_r(N) - \theta(N)$ is the discrete position error, and the integrals are evaluated by the trapezoidal rule. The discrete adaptation laws can be written as $$r(N) = W_p e(N) + W_v \dot{e}(N) \quad (31)$$

$$f(N) = f(N-1) + \left[\gamma_2 \cdot \frac{T_s}{2} - \gamma_1\right]r(N-1) + \quad (32)$$

$$\left[\gamma_2 \cdot \frac{T_s}{2} + \gamma_1\right]r(N)$$

$$K_p(N) = K_p(N-1) + \left[\alpha_2 \cdot \frac{T_s}{2} - \alpha_1\right]r(N-1)e'(N-1) + \quad (33)$$

$$\left[\alpha_2 \cdot \frac{T_s}{2} + \alpha_1\right]r(N)e'(N)$$

$$K_v(N) = K_v(N-1) + \left[\beta_2 \cdot \frac{T_s}{2} - \beta_1\right]r(N-1)\dot{e}'(N-1) + \quad (34)$$

$$\left[\beta_2 \cdot \frac{T_s}{2} + \beta_1\right]r(N)\dot{e}'(N)$$

In the above equations, we have assumed that the discrete velocity error $\dot{e}(N)$ is directly available using a tachometer; otherwise the velocity error must be formed in software as $$\dot{e}(N) = \frac{e(N) - e(N-1)}{T_s}.$$

Equations (31)-(34) consititute the recursive algorithm for updating the feed-back controller.

Let us now evaluate the number of on-line mathematical operations that need to be performed in each sampling period $T_s$ to form the discrete feedback control law $$V_\alpha(N) = f(N) + K_p(N)e(N) + K_v(N)\dot{e}(N) \quad (35)$$

where $e(N)$ and $\dot{e}(N)$ are assumed to be available. For a centralized feedback controller, the total numbers of additions and multiplications in forming $V_\alpha(N)$ are equal to $6n^2 + 3n$ and $6n^2 + 8n$, respectively, where n is the number of manipulator joints. For a decentralized feedback controller, the numbers of operations are reduced to $9n$ additions and $14n$ multiplications. The small number of mathematical operations, particularly in the decentralized case, suggests that we can implement a digital servo loop with a high sampling rate, i.e. very small $T_s$. This is a very important feature in digital control since slow sampling rates degrade the tracking performance of the manipulator, and may even lead to closed-loop instability.

Let us now turn to the discrete feedforward control law $$V_o(N) = M_o[m_o, \theta_r(N)]\ddot{\theta}_r(N) + N_o[m_o, \theta_r(N)] \quad (36)$$

where $\theta_r(N)$ and $\dot{\theta}_r(N)$ are directly available from the trajectory generator. Since the feedforward controller is "outside" the servo loop, it is possible to have a fast servo loop around the feedback controller, and the feedforward voltage $V_o(N)$ is then added at a slower rate. Furthermore, the feedforward control action $V_o(N)$ is computed as a function of the reference trajectory $\theta_r(N)$ only. In applications where the desired path $\theta_r(t)$ is known in advance, the values of the voltage $V_o(N)$ can be computed "off-line" before motion begins and stored in a look-up table in the computer memory. At run time, this precomputed voltage history is then simply read out of the look-up table and used in the control law. Such an approach can be quite inexpensive computationally at run time, while allowing implementation of a high servo rate for feedback control.

The total control law in discrete time is given by $$V(N) = V_o(N) + V_a(N) \qquad (37)$$
$$= M_o[m_o, \theta_r(N)]\dot{\theta}_r(N) + N_o[m_o, \theta_r(N), \dot{\theta}_r(N)] + f(N) + K_p(N)e(N) + K_v(N)\dot{e}(N)$$

Equations (31)–(37) constitute the digital control algorithm that is implemented for on-line computer control of robotic manipulators.

5. Robust Adaptive Control

The adaptation laws for the feedback controller as described in Section 3 are derived under the ideal conditions where unmodeled dynamics is not present and disturbances do not affect the system. In such idealistic conditions, the rate of change of a typical feedback gain $K(t)$ which acts on the signal $s(t)$ is found to be that set forth below in equation number (38). In expressing this relationship the auxiliary signal $f(t)$, is developed by setting $s(t) \equiv 1$.

$$\dot{K}(t) = \mu_1 \frac{d}{dt}[r(t)s'(t)] + \mu_2[r(t)s'(t)] \qquad (38)$$

where $\mu_1$ and $\mu_2$ are scalar adaptation gains. Extensive simulation and experimental studies suggest that too low adaptation gains result in smooth variations in $K(t)$, but poor tracking performance. On the other hand, too high adaptation gains lead to oscillatory and noisy behavior of $K(t)$, but yield perfect trajectory tracking. (Note that for both low and high adaptation gains, the range of control voltage is more or less than the same, since it is primarily dependent on the reference trajectory and manipulators dynamics). This argument suggests that large adaptations gains are necessary to maintain a high speed of controller adaptation in order to ensure rapid convergence of the tracking-error $e(t)$ to zero. In practice, the adaptation gains cannot be selected too large due to a phenomenon known as "fast adaptation instability." When the speed of adaptation, i.e. $K(t)$, is too high, the gain $K(t)$ drifts to large values and excites the unmodeled dynamics (parasitic) of the system, which in turn leads to instability of the control system. High speed of adaptation can be either due to large adaptation gains or fast reference trajectory. Another mechanism for instability can be observed in decentralized adaptive control systems. The interconnections among subsystems can cause local controller parameters to drift to large values and hence excite the parasitic and lead to instability. For instance, a high amplitude or high frequency reference trajectory of one subsystem can destabilize the local adaptive controller of another subsystem by exciting its parasitic through the interconnections.

We conclude that in an adaptive robot control system, unstable behavior can be observed with large adaptation rates or a high degree of interjoint couplings. It is unfortunate that in trying to compensate for the change in the system, the adaptive controller may become sensitive to its own parameters.

I shall now discuss two possible approaches for avoiding the fast adaptation instability:

5.1 Time-Varying Adaptation Gains

From equation (38), it is seen that the speed of adaptation $\dot{K}(t)$ depends on the magnitude of the adaptation gains $(\mu_1, \mu_2)$ and on the weighted tracking-error $r(t)$. Simulation studies with constant adaptation gain algorithms suggest that high gains lead to faster convergence of the tracking-error to zero. However, in the initial phase of adaptation, the weighted tracking-error $r(t)$ is large (e.g. due to static friction) and too high a value of adaptation gain causes instability problems. As the adaptation process goes on, the term $r(t)$ decreases and at this time the adaptation gain is increased in order to achieve faster convergence. With this motivation, the constant adaptation gains $\mu_1(t)$ and $\mu_2(t)$ start with small initial values when the errors are usually large and, as time proceeds, build up to appropriate large final values when the errors are small.

5.2 Robustness VIA $\sigma$-Modification

The $P+I$ adaptation laws discussed so far have no provision for rejecting the destabilizing effect of "noise" introduced through unmodeled dynamics or disturbances. The integral term in the adaptation law acts to integrate a quantity related to the noise term squared. The integration of such a non-negative quantity inevitably creates an undesirable drift in the integral term and ultimately deteriorates the adaptive system performance.

Ioannou and Kokotovic (*Instability Analysis and Improvement of Robustness of Adaptive Control*, Automatica, Vol. 20, No. 5, pp. 583–594, 1984; *Robust Redesign of Adaptive Control*, IEEE Trans. Aut. Control, Vol. AC-29, No. 3, pp. 202–211, 1984) suggest "$\sigma$-modification" to the adaptation law in order to eliminate the drift in the integral term and thus counteract instability. The basic idea is to modify the adaptation law (38) by adding a term $-\sigma K(t)$ which removes its purely integral action, that is, instead of (38) we use the $\sigma$-modified law $$\dot{K}(t) = -\sigma K(t) + \mu_1 \frac{d}{dt}[r(t)s'(t)] + \mu_2[r(t)s'(t)] \qquad (39)$$

where $\sigma$ is a positive scalar design parameter. The size of $\sigma$ reflects our lack of knowledge about the unmodeled dynamics and disturbances. In equation (39), the leakage or decay term $-\sigma K(t)$ acts to dissipate the integral buildup, and eliminate the drift problem which excites the parasitic and leads to instability. The price paid for the attained robustness is that the tracking-error $\|r(t)\|$ now converges to a bonded non-zero residual set, and hence perfect trajectory tracking is no longer achieved in theory. The size of this residual set depends on the value of $\sigma$, but can often be made sufficiently small so that performance degradation is acceptable in practice. The drawback of the $\sigma$-modified adaptation law, however, is that in the absence of unmodeled dynamics and disturbances, we can no longer guarantee that $\lim_{t \to \infty} \|r(t)\| = 0$, unless $\sigma = 0$.

The Proportional + Integral + Sigma $(P+I+\sigma)$ adaptation laws for the feedback controller in continuous time are now given by $$f(t) = f(0) + \gamma_1 r(t) + \gamma_2 \int_0^t r(t)dt - \sigma_1 \int_0^t f(t)dt \tag{40}$$

$$K_p(t) = K_p(0) + \alpha_1 r(t)e'(t) + \alpha_2 \int_0^t r(t)e'(t)dt - \sigma_2 \int_0^t K_p(t)dt \tag{41}$$

$$K_v(t) = K_v(0) + \beta_1 r(t)\dot{e}(t) + \beta_2 \int_0^t r(t)\dot{e}(t)dt - \sigma_3 \int_0^t K_v(t)dt \tag{42}$$

where $\{\sigma_1,\sigma_2,\sigma_3\}$ are positive scalar design parameters. For digital control implementation with sampling period $T_s$, (40)–(42) yield the recursive adaptation laws $$f(N) = \left[\frac{1 - \sigma_1 \frac{T_s}{2}}{1 + \sigma_1 \frac{T_s}{2}}\right]f(N-1) + \left[\frac{\gamma_2 \frac{T_s}{2} - \gamma_1}{1 + \sigma_1 \frac{T_s}{2}}\right]r(N-1) + \left[\frac{\gamma_2 \frac{T_s}{2} \gamma_1}{1 + \sigma_1 \frac{T_s}{2}}\right]r(N) \tag{43}$$

$$K_p(N) = \left[\frac{1 - \sigma_2 \frac{T_s}{2}}{1 + \sigma_2 \frac{T_s}{2}}\right]K_p(N-1) + \left[\frac{\alpha_2 \frac{T_s}{2} - \alpha_1}{1 + \sigma_2 \frac{T_s}{2}}\right]r(N-1)e'(N-1) + \left[\frac{\alpha_2 \frac{T_s}{2} - \alpha_1}{1 + \sigma_2 \frac{T_s}{2}}\right]r(N)e'(N) \tag{44}$$

$$K_v(N) = \left[\frac{1 - \sigma_3 \frac{T_s}{2}}{1 + \sigma_3 \frac{T_s}{2}}\right]K_v(N-1) + \left[\frac{\beta_2 \frac{T_s}{2} - \beta_1}{1 + \sigma_3 \frac{T_s}{2}}\right]r(N-1)\dot{e}(N-1) + \left[\frac{\beta_2 \frac{T_s}{2} - \beta_1}{1 + \sigma_3 \frac{T_s}{2}}\right]r(N)\dot{e}(N) \tag{45}$$

In conclusion, the use of $\sigma$-modification is essential in obtaining sufficient conditions for boundedness in the presence of parasitic. However, in the absence of parasitic, $\sigma$ causes a tracking-error of $0(\sqrt{\sigma})$ to remain. Therefore, there is a trade-off between boundedness of all signals in the presence of parasitic and loss of exact convergence of the tracking-error to zero in the absence of parasitic. In other words, we have sacrificed the performance in an idealistic situation in order to achieve robustness in realistic situations which are more likely to occur in practical applications.

6. Simulation Results

The tracking control scheme developed in Section 3 has been applied to a two-link manipulator for illustration of the benefits of the invention.

Figure 3:
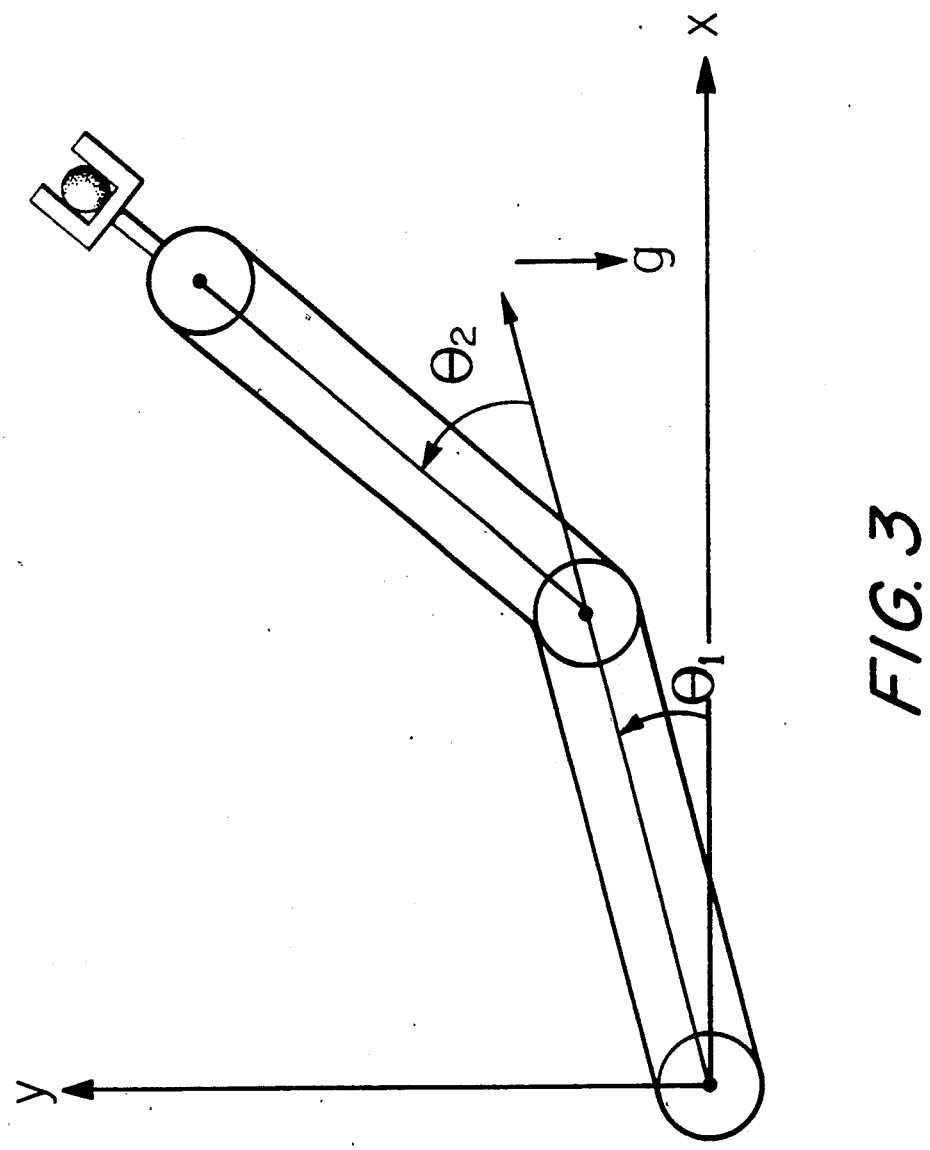
FIG. 3 is a figure depicting a two-link planar manipulator in a vertical plane in accordance with the invention.

Consider the planar two-link manipulator in a vertical plane shown in FIG. 3, with the end-effector carrying a payload of mass m. The robot links are assumed to be driven directly (without gears) by two servomotors with negligible dynamics. Hence the arm is "direct drive" and we can treat the joint torques as the driving signals. The dynamic equation of motion which relates the joint torque vector $$T = \begin{pmatrix} T_1 \\ T_2 \end{pmatrix}$$

to the joint angle vector $$\theta = \begin{pmatrix} \theta_1 \\ \theta_2 \end{pmatrix}$$

is given by H. Seraji, *A New Approach to Adaptive Control of Manipulators*, supra, and H. Seraji, M. Jamshidi, Y. T. Kin, and M. Shahinpoor, *Linear Multivariable Control of Two-Link Robots*, Journal of Robotic Systems, Vol. 3, No. 4, pp. 349–365, 1986.

$$T = M(\theta)\ddot{\theta} + N(\theta,\dot{\theta}) + G(\theta) + H(\dot{\theta}) + mJ'(\theta)[J(\theta)\ddot{\theta} + \dot{J}(\theta,\dot{\theta})\dot{\theta} + g] \tag{46}$$

where the above terms are:

$$M(\theta) = \begin{pmatrix} a_1 + a_2\cos\theta_2 & a_3 + \frac{a_2}{2}\cos\theta_2 \\ a_3 + \frac{a_2}{2}\cos\theta_2 & a_3 \end{pmatrix}; N(\theta,\dot{\theta}) = \begin{pmatrix} -(a_2\sin\theta_2)(\dot{\theta}_1\dot{\theta}_2 + \frac{\dot{\theta}_2^2}{2}) \\ (a_2\sin\theta_2)\frac{\dot{\theta}_1^2}{2} \end{pmatrix}$$

$$G(\theta) = \begin{pmatrix} a_4\cos\theta_1 + a_5\cos(\theta_1 + \theta_2) \\ a_5\cos(\theta_1 + \theta_2) \end{pmatrix}; H(\dot{\theta}) = \begin{pmatrix} V_1\dot{\theta}_1 + V_2 sgn(\dot{\theta}_1) \\ V_3\dot{\theta}_2 + V_4 sgn(\dot{\theta}_2) \end{pmatrix}$$

$$J(\theta) = \begin{pmatrix} -l_1\sin\theta_1 - l_2\sin(\theta_1 + \theta_2) & -l_2\sin(\theta_1 + \theta_2) \\ l_1\cos\theta_1 + l_2\cos(\theta_1 + \theta_2) & l_2\cos(\theta_1 + \theta_2) \end{pmatrix}; g\begin{pmatrix} 0 \\ +9.81 \end{pmatrix}$$

In the above expressions, $\alpha_1, \ldots, \alpha_5$ are constant parameters obtained from the masses ($m_1, m_2$) and the lengths ($l_1, l_2$) of the robot links, and ($V_1, V_3$) and ($V_2, V_4$) are coefficients of viscous and Coloumb frictions respectively. For the particular robot under study, the numerical values of the link parameters are $m_1 = 15.91$ Kg; $m_2 = 11.36$ Kg; $l_1 = l_2 = 0.432$ m so that they represent links 2 and 3 of the Unimation PUMA 560 robot. This yields the following numerical values for the model parameters (H. Seraji, M. Jamshidi, Y. T. Kim, and M. Shaninpoor, supra)

$\alpha_1 = 3.82$; $\alpha_2 = 2.12$; $\alpha_3 = 0.71$ $\alpha_4 = 81.82$; $\alpha_5 = 24.06$ The friction coefficients are chosen as $V_1 = V_3 = 1.0$ Nt.m/rad.sec$^{-1}$ and $V_2 = V_4 = 0.5$ NT.m and the payload mass is initially m = 10.0 Kg.

The joint angles $\theta_1(t)$ and $\theta_2(t)$ are required to track the cycloidal reference trajectories $$\theta_{r1}(t) = -\frac{\pi}{2} + \frac{1}{4}\left[\frac{2\pi t}{3} - \sin\frac{2\pi t}{3}\right] \quad 0 \leq t \leq 3$$
$$= 0 \quad 3 < t$$

$$\theta_{r2}(t) = \frac{1}{4}\left[\frac{2\pi t}{3} - \sin\frac{2\pi t}{3}\right] \quad 0 \leq t \leq 3$$
$$= \frac{\pi}{2} \quad 3 < t$$

so that the robot configuration changes smoothly from the initial posture $$\left\{\theta_1 = -\frac{\pi}{2}, \theta_2 = 0\right\}$$

to the final posture $$\left\{\theta_1 = 0, \theta_2 = +\frac{\pi}{2}\right\}$$

in three seconds. The joint angles are controlled by the feedforward and/or feedback tracking control scheme $$T_1(t) = [M_{11}(\theta_r)\ddot{\theta}_{r1} + M_{12}(\theta_r)\ddot{\theta}_{r2} + G_1(\theta_r)] + [f_1(t) + k_{p1}(t)e_1(t) + k_{v1}(t)\dot{e}_1(t)]$$

$$T_2(t) = [M_{21}(\theta_r)\ddot{\theta}_{r1} + M_{22}(\theta_r)\ddot{\theta}_{r2} + G_2(\theta_r)] + [f_2(t) + k_{p2}(t)e_2(t) + k_{v2}(t)e_2(t)] \quad (48)$$

where M and G are defined in (46). It is seen that each tracking control law is composed of feedforward and feedback components. The feedforward component has a centralized structure and is based on the manipulator dynamic model (46). It is a function of the reference trajectory $\theta_r(t)$ and contains the inertial acceleration term $M(\theta_r)\ddot{\theta}_r$ and the gravity loading term $G(\theta_r)$ of the arm itself, without the payload (i.e., m = 0). The Coriolis and centrifugal term $N(\theta,\dot{\theta})$, the frictional term $H(\dot{\theta})$, and the payload term are assumed to be unavailable for on-line control and are not incorporated in the feedforward controller. The feedback controller has a decentralized structure and is composed of the auxiliary signal f(t), the position feedback term $k_p(t)e(t)$, and the velocity feedback term $k_v(t)\dot{e}(t)$ where $e(t) = \theta_r(t) - \theta(t)$ is the position tracking-error in radians. The feedback terms are updated, as (In this example, the $\sigma$-modification was not necessary, and hence $\sigma_1 = \sigma_2 = \sigma_3 = 0$). And it may be shown that:

$$f_1(t) = f_1(0) + \gamma_{1i}r_i(t) + \gamma_{2i}\int_0^t r_i(t)dt - \sigma_{1i}\int_0^t f_1(t)dt = \int_0^t r_i(t)dt \quad (49)$$

$$k_{pi}(t) = k_{pi}(0) + \alpha_{1i}r_i(t)e_i(t) + \alpha_{2i}\int_0^t r_i(t)e_i(t)dt - \sigma_{2i}\int_0^t k_{pi}(t)dt \quad (50)$$
$$= r_i(t)e_i(t) + 10\int_0^t r_i(t)e_i(t)dt$$

$$k_{vi}(t) = k_{vi}(0) + \beta_{1i}r_i(t)\dot{e}_i(t) + \beta_{2i}\int_0^t r_i(t)\dot{e}_i(t)dt - \sigma_{3i}\int_0^t k_{vi}(t)dt \quad (51)$$
$$= r_i(t)\dot{e}_i(t) + 10\int_0^t r_i(t)\dot{e}_i(t)dt$$

$$r_i(t) = w_{pi}e_i(t) + w_{vi}\dot{e}_i(t) = 3000e_i(t) + 1500\dot{e}_i(t) \quad (52)$$

Note that the initial values of the auxiliary signal and the feedback gains are all chosen arbitrarily as zero. (The numerical values of $w_p$ and $w_v$ in (52) are large since the unit of angle in the control program is "radian." A simple trapezoidal integration rule is used to compute the integrals in the adaptation laws (49)–(51) with dt = 1 millisecond.

Figure 4I:
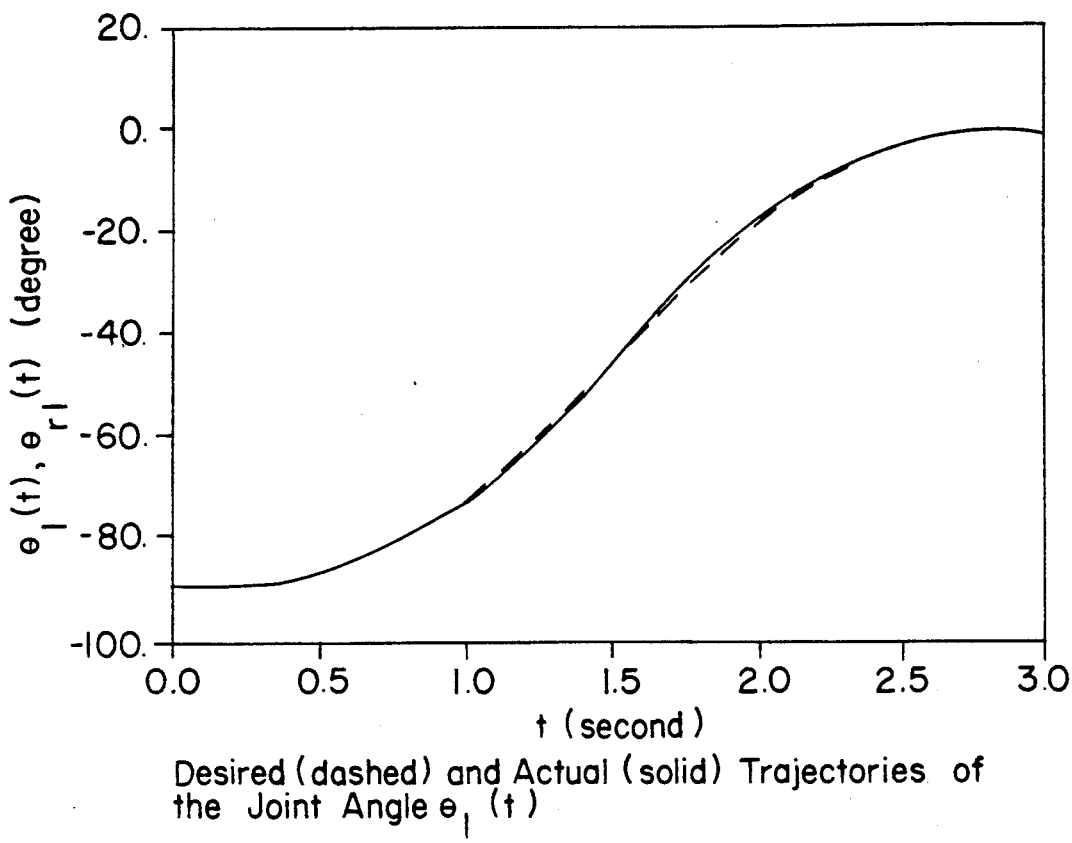
FIG. 4(i) is a figure depicting the desired [dashed] and actual [solid] trajectories of the joint angle $\theta_1(t)$ in accordance with the invention.
Figure 4I:
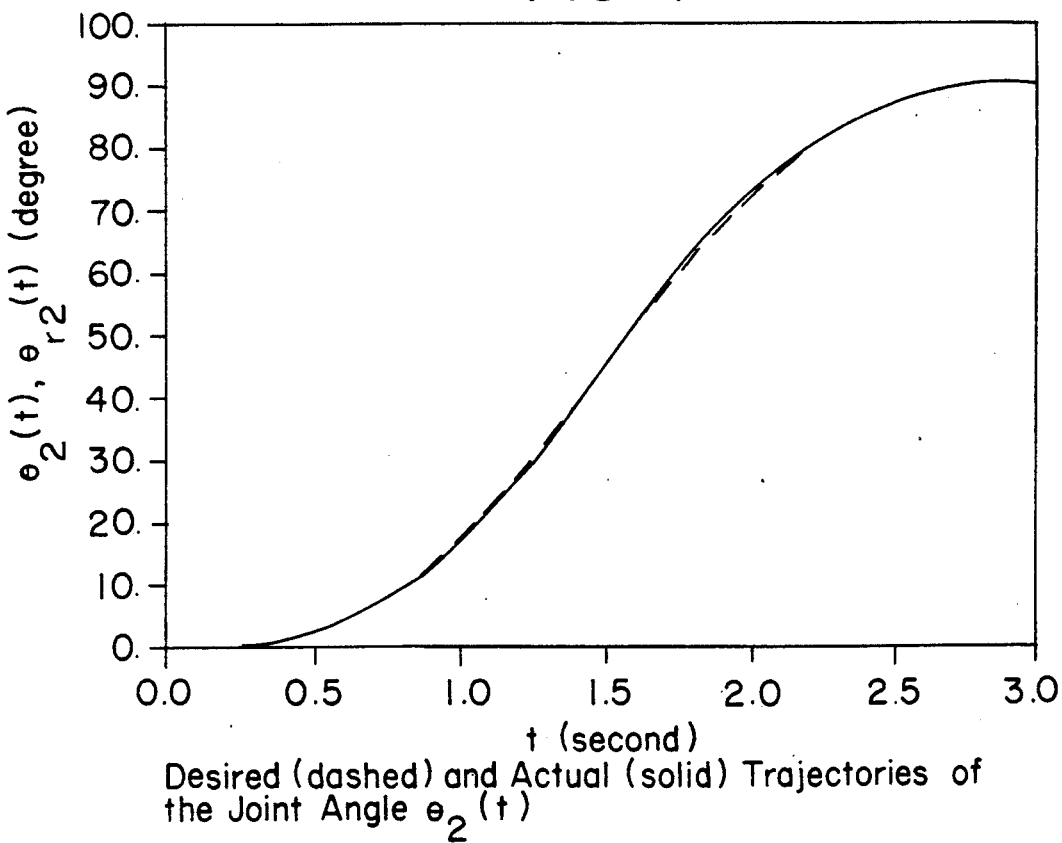
Figure 5I:
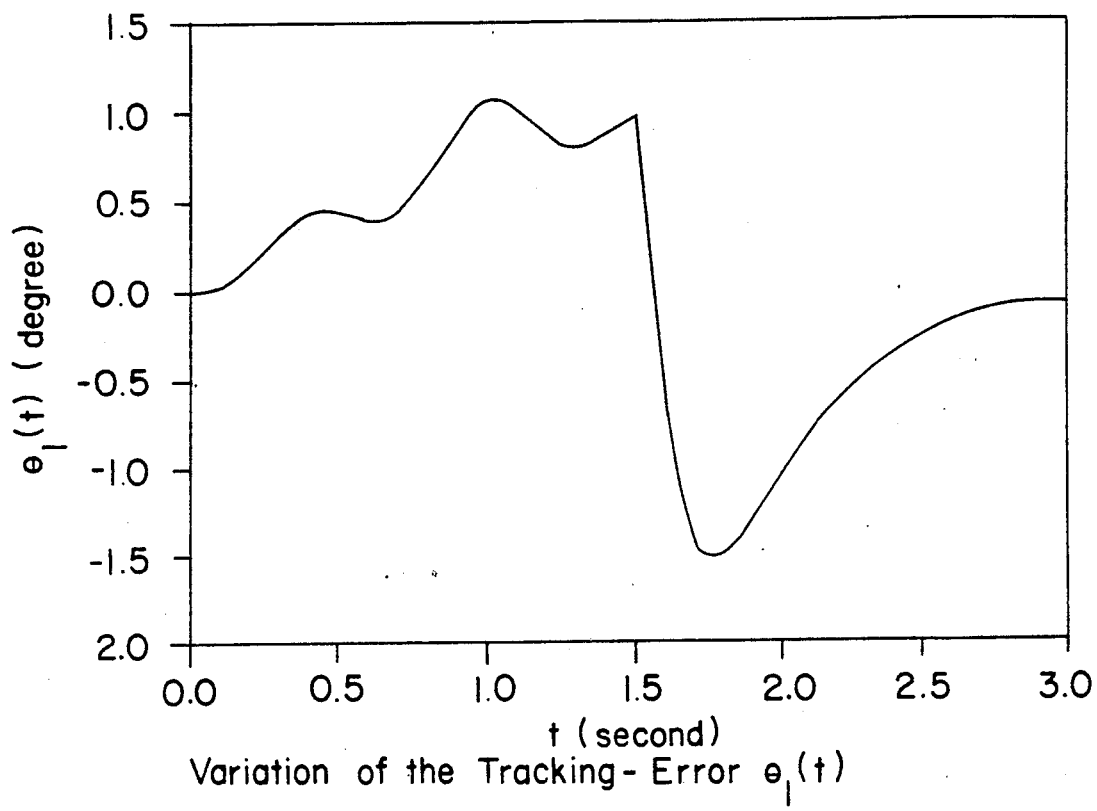
FIG. 5(i) is a figure depicting the variation of the tracking—error $e_2(t)$ in accordance with the invention.
Figure 5I:
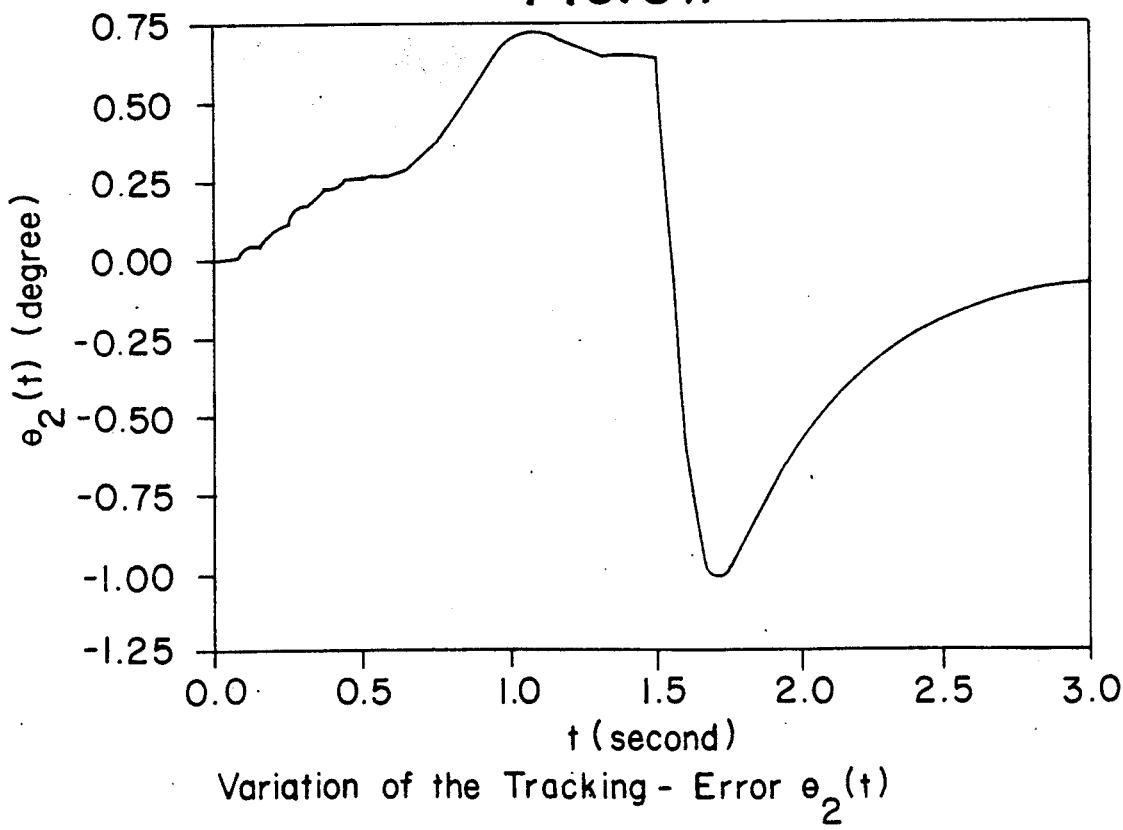
Figure 6I:
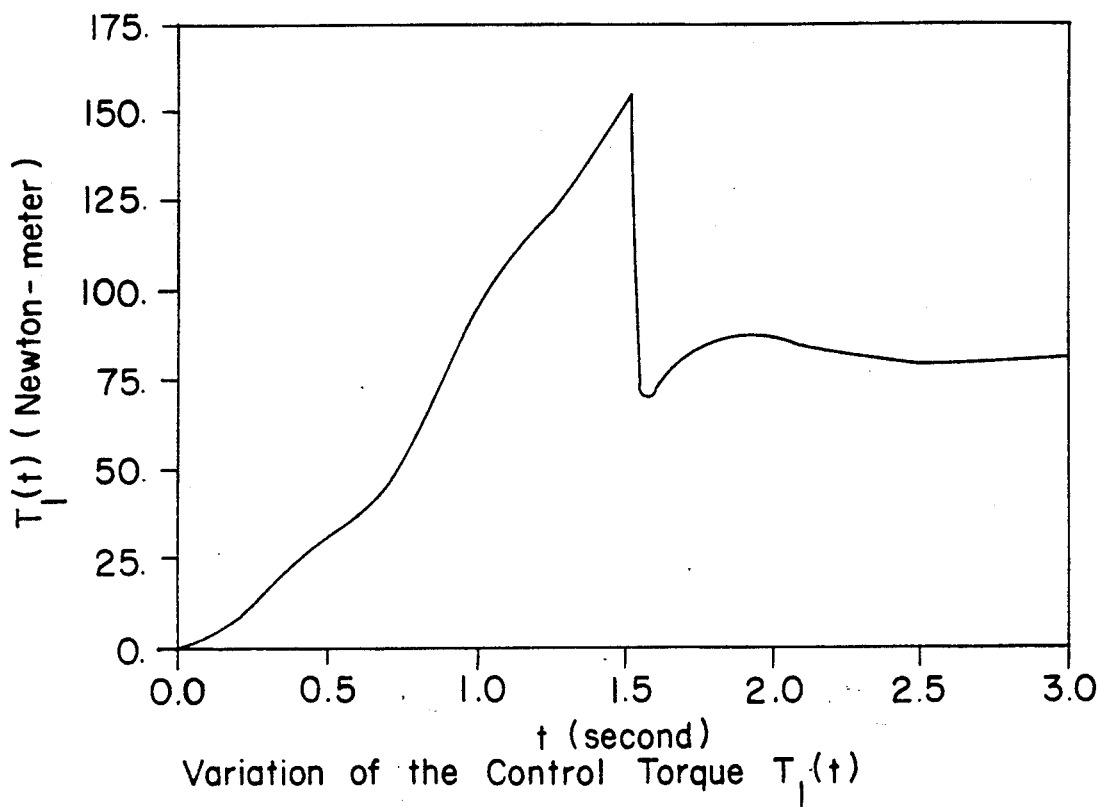
FIG. 6(i) is a figure depicting the variation of the control torque $T_1(t)$ in accordance with the invention.
Figure 6I:
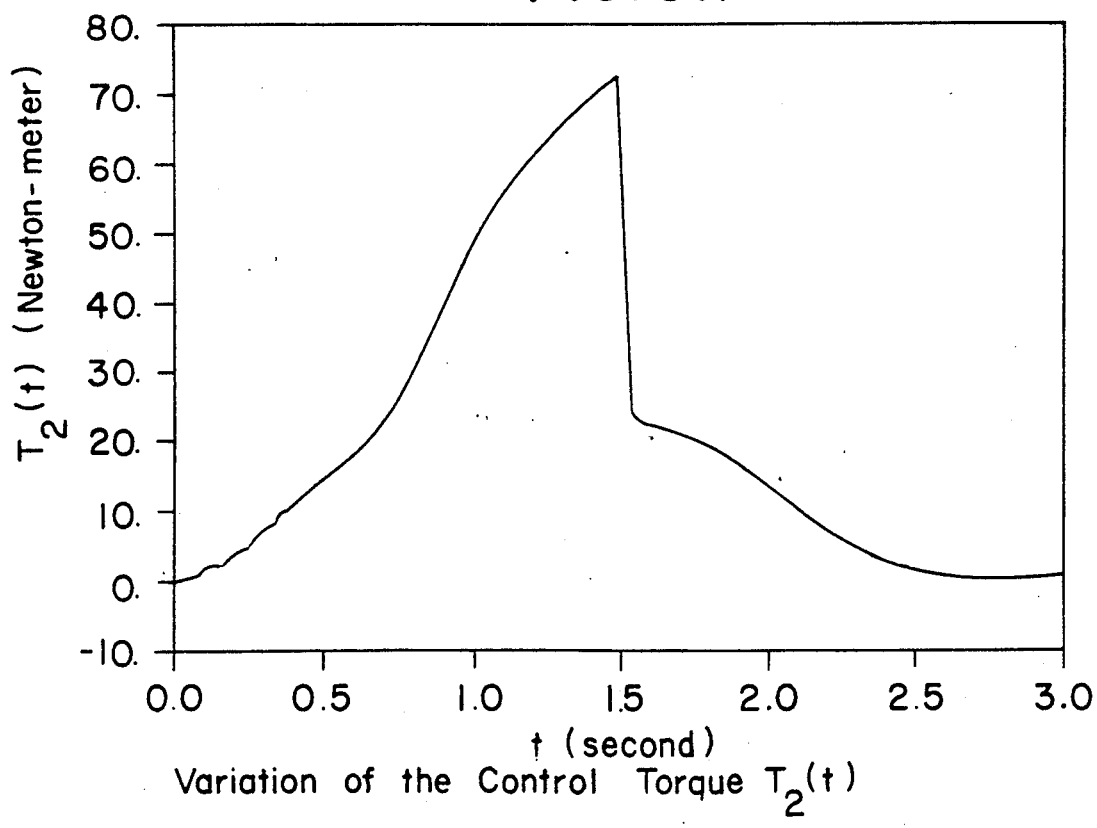
Figure 7I:
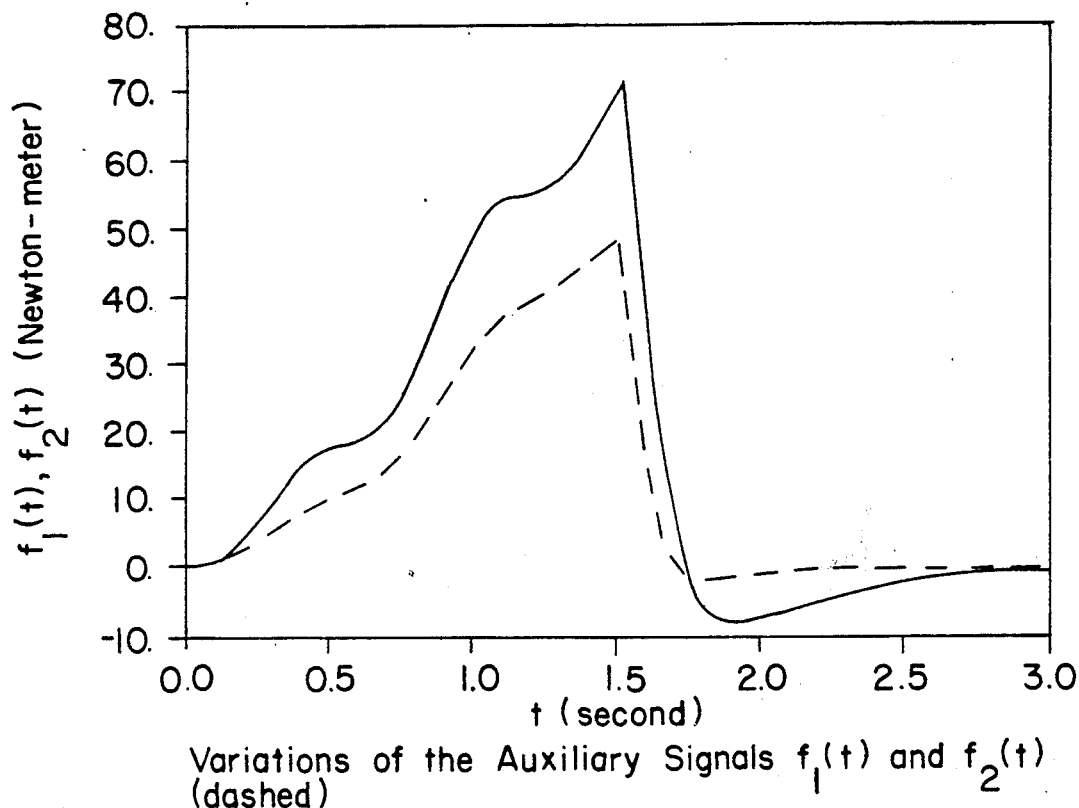
FIG. 7(i) is a figure depicting the variations of the auxiliary signals $f_1(t)$ [solid] and $f_2(t)$ [dashed] in accordance with the invention.
Figure 7I:
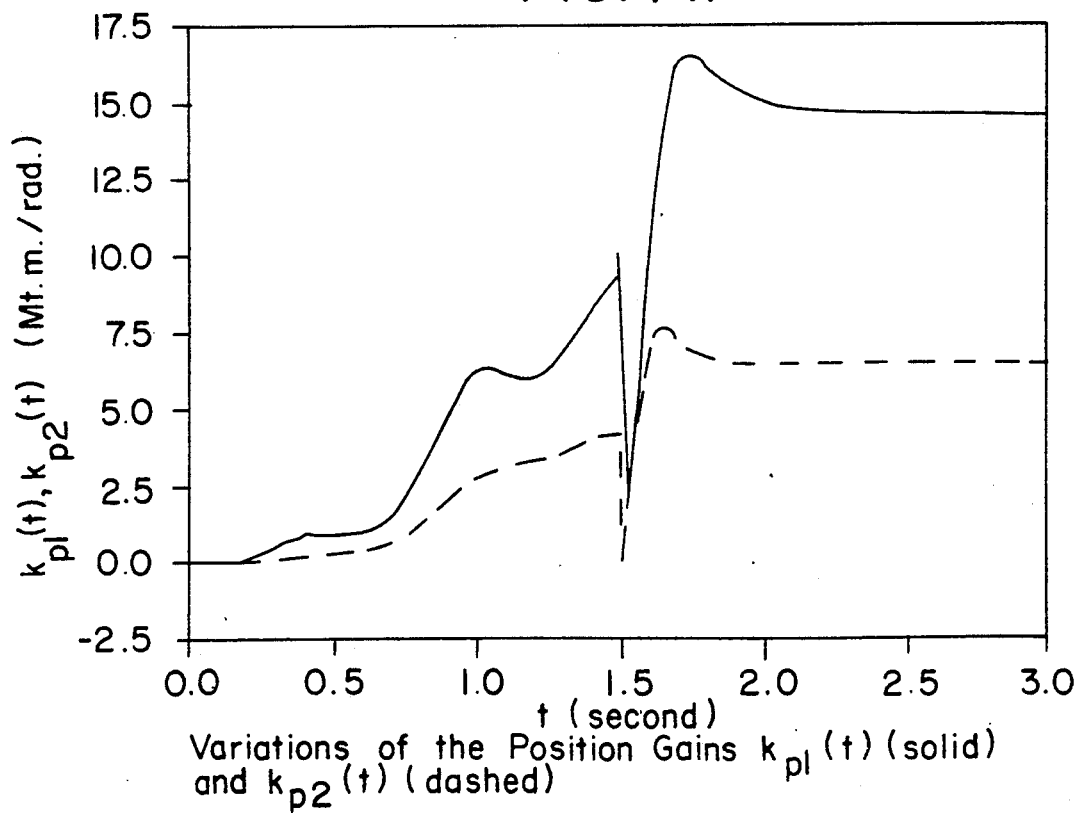

To evaluate the performance of the proposed control scheme, the nonlinear dynamic model of the manipulator-plus-payload (46) and the tracking control scheme (48) are simulated on a DEC-VAX 11/750 with the sampling period of 1 millisecond. In order to illustrate the effectiveness of the proposed control scheme to compensate for sudden gross variation in the payload mass, the mass is suddenly decreased from m = 10.0 Kg to zero at 6 = 1.5 seconds (i.e. the payload is dropped) while the manipulator is in motion under the control system operating in accordance with equation (48). The results of the computer simulation are shown in FIG. 4(i)–(ii) and indicate that the joint angles $\theta_1(t)$ and $\theta_2(t)$ track their corresponding reference trajectories it is also shown that $\theta_{r1}(t)$ and $\theta_{r2}(t)$ vary closely throughout the motion, despite the sudden payload variation. FIGS. 5(i)–(ii) and 6(i)–(ii) show the responses of the tracking-errors $e_1(t)$ and $e_2(t)$ and the control torques $T_1(t)$ and $T_2(t)$, and indicate a sudden jump at t = 1.5" due to payload change. To show the feedback adaptation process, time variations of the auxiliary signal $F_1(t)$, the position gain $k_{pi}(t)$, and the velocity gain $k_{vi}(t)$ are shown in FIGS. 7(i)–(iii). It is seen that the feedback terms have adapted rapidly on-line to cope with the sudden payload mass change. The results demonstrate that the invention does not require knowledge of the payload mass m and can adapt itself rapidly to cope with unpredictable gross variations in m and sustain a good tracking performance.

7. Experimental Results

In this section, the tracking control system described in Section 3.2 is applied to a PUMA industrial robot for test and evaluation purposes.

Figure 8:
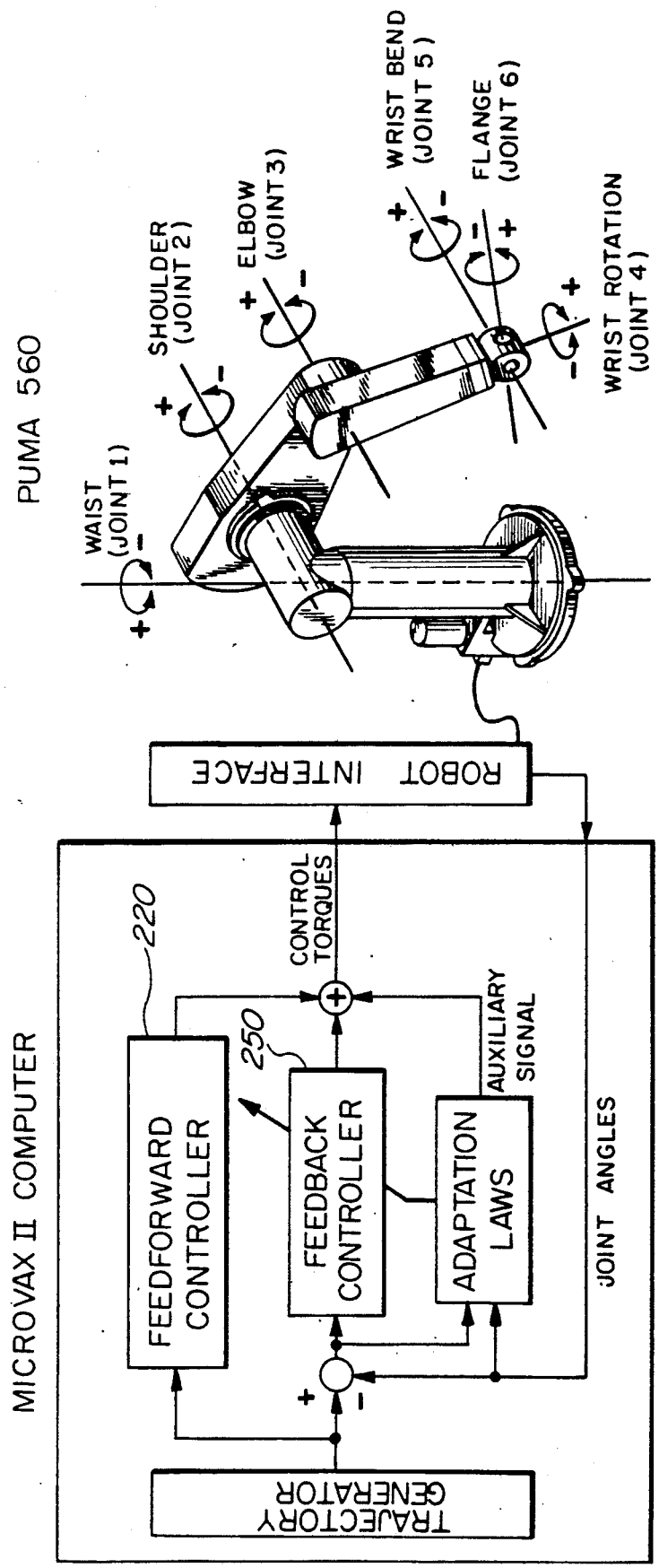
FIG. 8 is a figure depicting the functional diagram of the testbed facility in accordance with the invention.

The testbed facility at the JPL Robotics Research Laboratory consists of a Unimation PUMA 560 robot and controller, and a DEC MicroVAX II computer, as shown in the functional diagram of FIG. 8. The MicroVAX II hosts the RCCl (Robot Control "C" Library) software, which was originally developed at Purdue University (V. Hayward and R. Paul, *Introduction to RCCL: A Robot Control 'C' Library*, IEEE Intern. Conf. on Robotics, pp. 293-297, Atlanta, 1984, and subsequently modified and implemented at JPL. During the operation of the arm, a hardware clock constantly interrupts the I/O program resident in the Unimation controller at a preselected sampling period $T_s$, which can be chosen as 7, 14, 28 or 54 milliseconds. At every interrupt, the I/O program gathers information about the state of the arm (such as joint encoder readings), and interrupts the control program in the MicroVAX II to transmit this data. The I/O program then waits for the control program to issue a new set of control signals, and then dispatches these signals to the appropriate joint motors. Therefore, the MICROVAX II acts as a digital controller for the PUMA arm and the Unimation controller is effectively by-passed and is utilized merely as an I/O device to interface the MicroVAX II to the joint motors.

To test and evaluate the control system described in Section 3, the tracking controller is implemented on the waist joint $\theta_1$ of the PUMA arm, while the other joints are held steady using the Unimation controller. The waist control law is coded within the RCCL environment on the MicroVAX II computer. It is assumed that the dynamic model and parameter values of the arm are not available, and hence the feedforward controller is eliminated. The control torque for the waist joint at each sampling instant N is obtained from the adaptive PID feedback control law $$T(N) = f(N) + k_p(N)e(N) + k_v(N)\dot{e}(N) \quad (53)$$

where $\dot{e}(N) = \theta_{r1}(N) - \theta_1(N)$ is the waist position error, $$\dot{e}(N) = \frac{e(N) - e(N-1)}{T_s}$$

is the waist velocity error formed in the software, and $\theta_{r1}(t)$ is the reference trajectory for the waist joint. The feedback terms are generated by the following simple recursive adaptation laws (In the experiment, it was not necessary to use $\sigma$-modification and hence we set $\sigma = 0$).

$$r(N) = 30e(N) + 20\dot{e}(N) \quad (54)$$

$$f(N) = f(N-1) + 0.175 [r(N) + r(N-1)] \quad (55)$$

$$k_p(N) = k_p(N-1) + 0.35[r(N)e(N) + r(N-1)e(N-1)] \quad (56)$$

$$k_v(N) = k_v(N-1) + 2.8[r(N)\dot{e}(N) + r(N-1)\dot{e}(N-1)] \quad (57)$$

where the adaptation gains are found after a few trial-and-errors. The sampling period is chosen as the smallest possible value $T_s = 7$ milliseconds (i.e. sampling $f_s = 144$ Hz), since the on-line computations involved in the control law (53) are a few simple arithmetic operations. No information about the PUMA dynamics is used for implementation of the control system, and hence the controller terms are initially zero; i.e. $f(0) = k_p(0) = k_v(0) = 0$.

The PUMA arm is initially at the "zero" position with the upper-arm horizontal and the forearm vertical forming a right-angle configuration. The waist joint angle $\theta_1(t)$ is commanded to change from the initial position $\theta_1 = 0$ to the goal position $$\theta_1 = \frac{\pi}{2}$$

in 2 seconds. The reference trajectory $\theta_{r1}(t)$ is synthesized by the cycloidal trajectory generator in RCCL as $$\theta_{r1}(t) = \frac{1}{4} [\pi t - \sin \pi t] \quad 0 \leq t \leq 2$$

$$= \frac{\pi}{2} \quad 2 < t$$

Figure 9I:
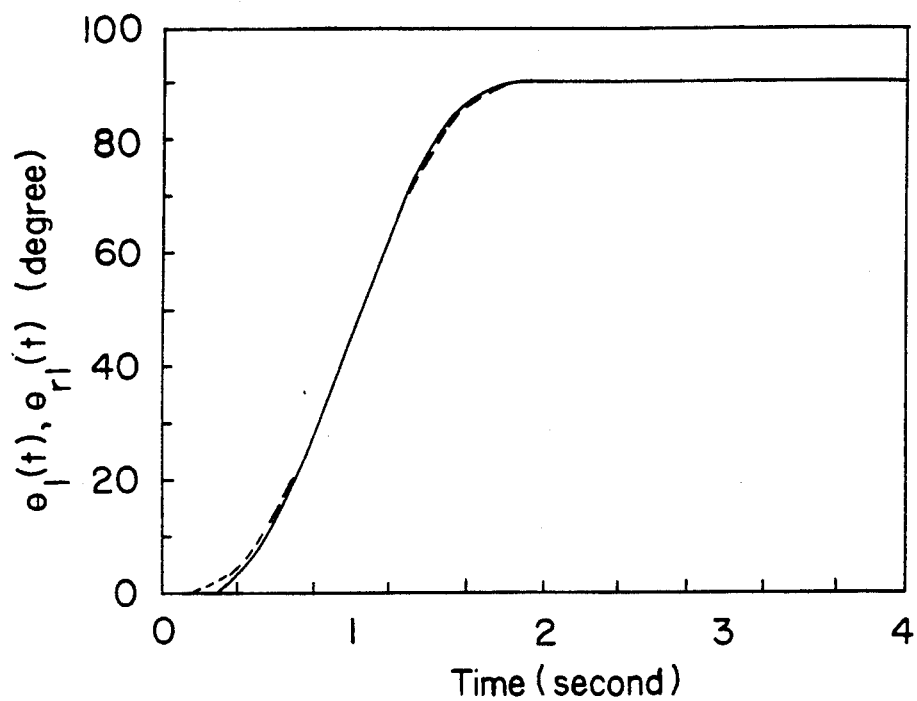
FIG. 9(i) is a figure depicting the desired [dashed] and actual [solid] PUMA waist angles under adaptive controller in accordance with the invention.
Figure 9I:
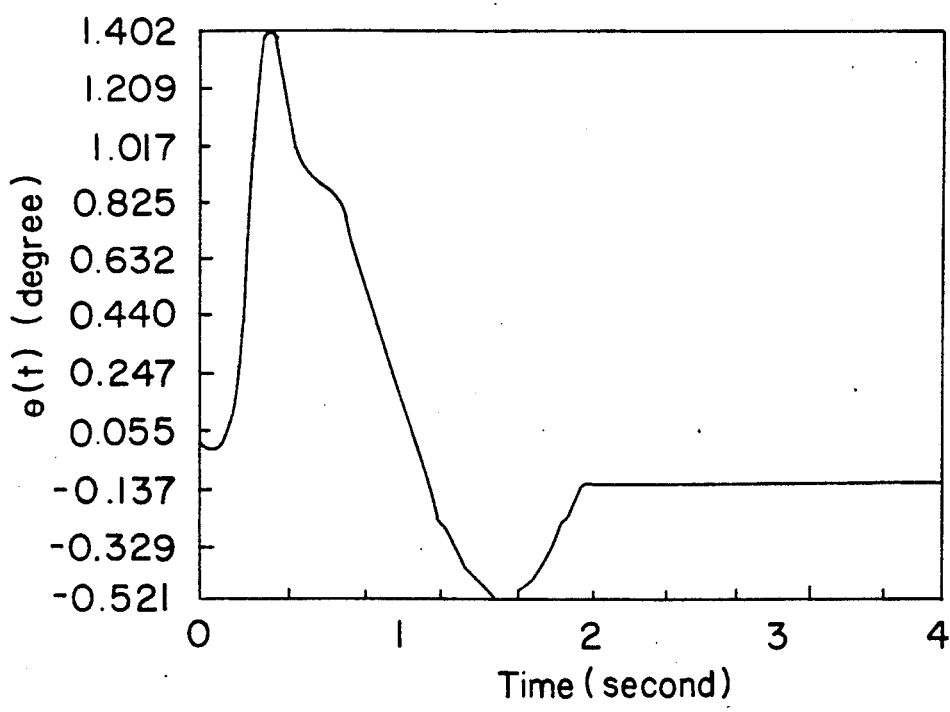

While the arm is in motion, the reading of the waist joint encoder at each sampling instant is recorded directly from the arm, converted into degrees and stored in a data file. The values of the auxiliary signal and feedback gains are also recorded at each sampling and kept in the same data file. FIG. 9(i) shows the desired and actual trajectories of the waist joint angle and the tracking-error is shown in FIG. 9(ii). It is seen that the joint angle $\theta_1(t)$ tracks the reference trajectory $\theta_{r1}(t)$ very closely, and the peak value of the tracking-error e(t) is 1.40°. The initial lag in the $\theta_1$ response is due to the large stiction (static friction) present in the waist joint.

Figure 10I:
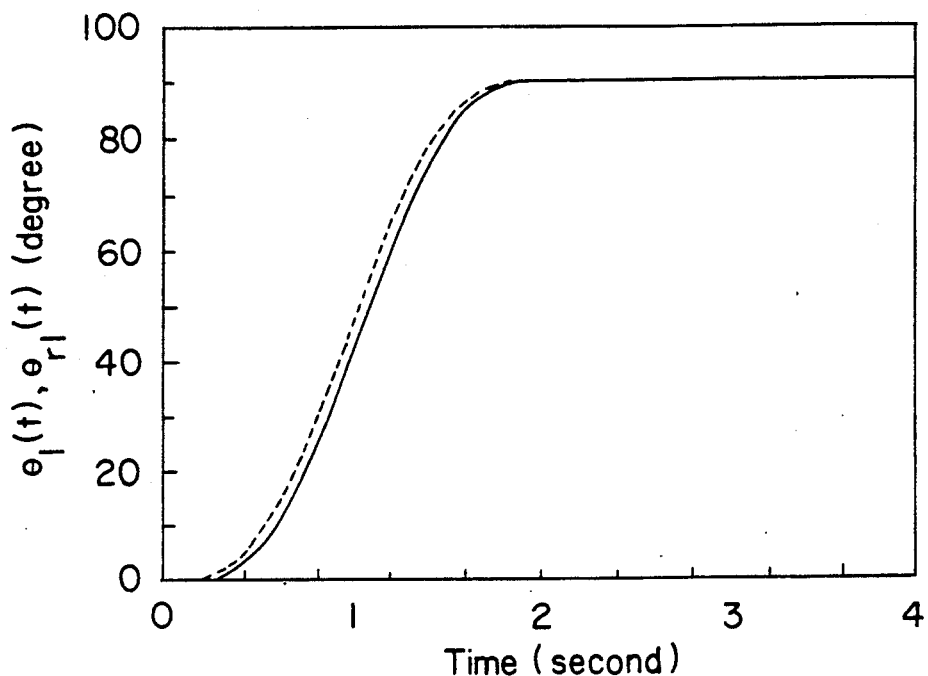
FIG. 10(i) is a figure depicting the desired [dashed] and actual [solid] PUMA waist angles under unimation controller in accordance with the invention.
Figure 10I:
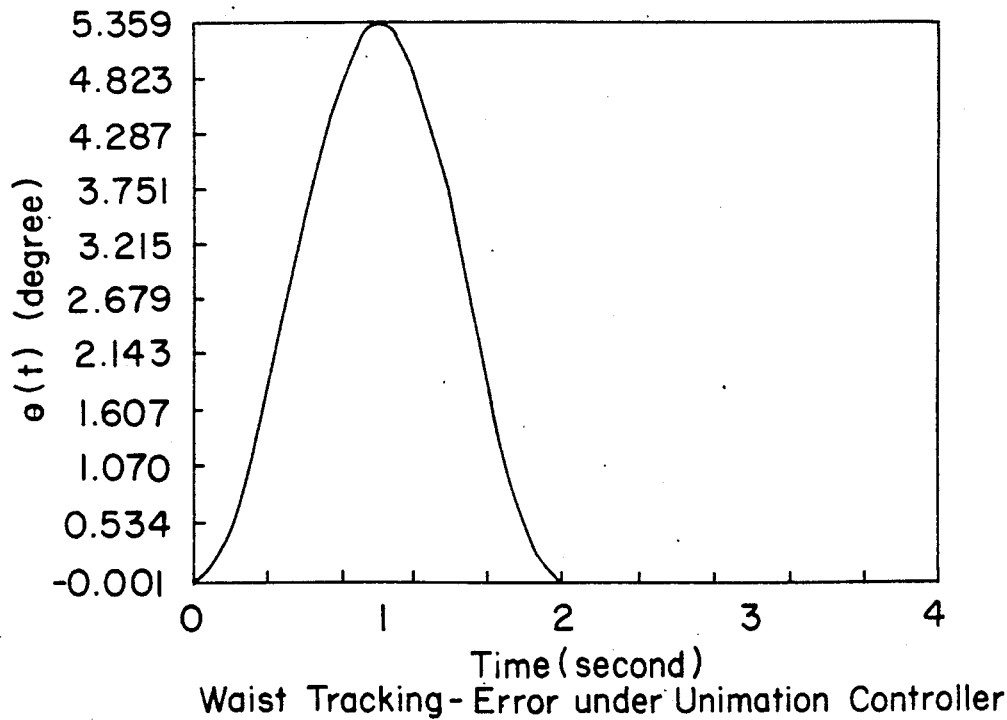
Figure 11I:
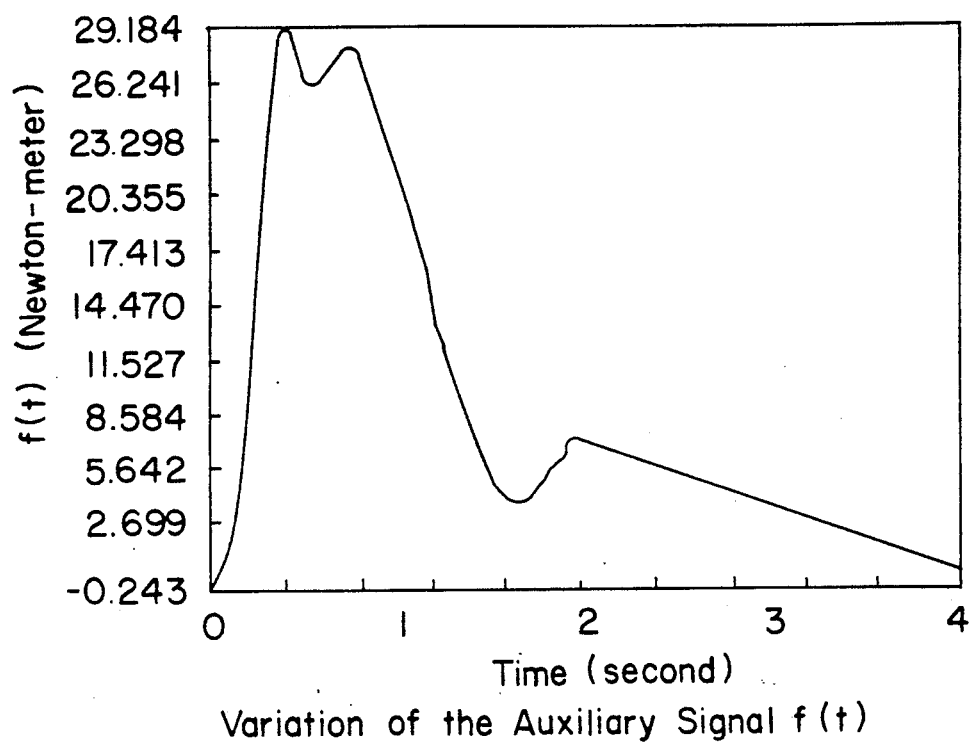
FIG. 11(i) is a figure depicting the variation of the auxiliary signal f(t) in accordance with the invention.
Figure 11I:
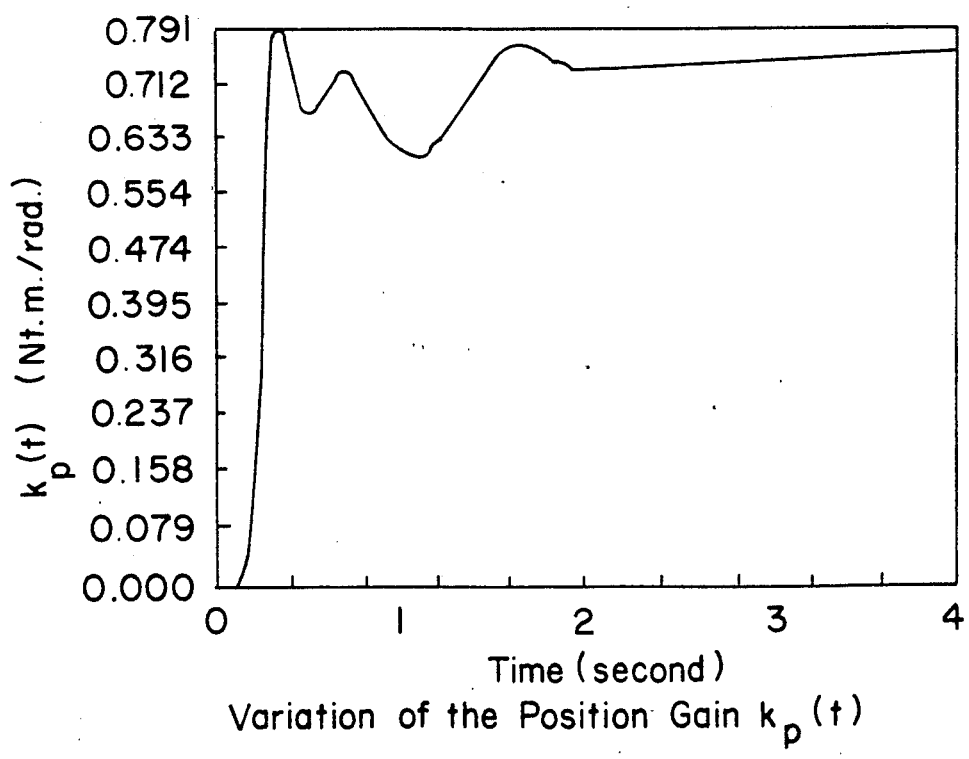

FIGS. 10(i)–(ii) show the tracking performance of the waist joint for the same motion using the Unimation controller, which is operating with the sampling period of 1 millisecond $f_s = 1$ KHz. It is seen that the peak joint tracking-error in FIG. 10(ii) is 5.36°, which produces 4 centimeters peak position error at the end-effector. By comparing FIGS. 9(ii) and 10(ii), it is evident that the tracking performance of the adaptive controller is noticeably superior to that of the Unimation controller, despite that fact that the Unimation control loop is 7 times faster than the adaptive control loop. The variations of the auxiliary signal f(t), the feedback gains $k_p(t)$ and $k_v(t)$, and the control torque T(t) are also shown in FIGS. 11(i)–(iv). It is seen that f(t), $k_p(t)$, $k_v(t)$, and T(t) all start from the initial values of zero and change with time.

I shall now discuss a test relating to the tracking performance of the adaptive controller in a different situation. Suppose that the configuration of the arm is changed smoothly from the initial zero posture to the final vertical posture while the waist joint is in motion. This effectively imposes a dynamic inertial load on the waist motor, as well as introducing torque disturbances in the waist control loop due to inter-joint couplings.

Figure 12:
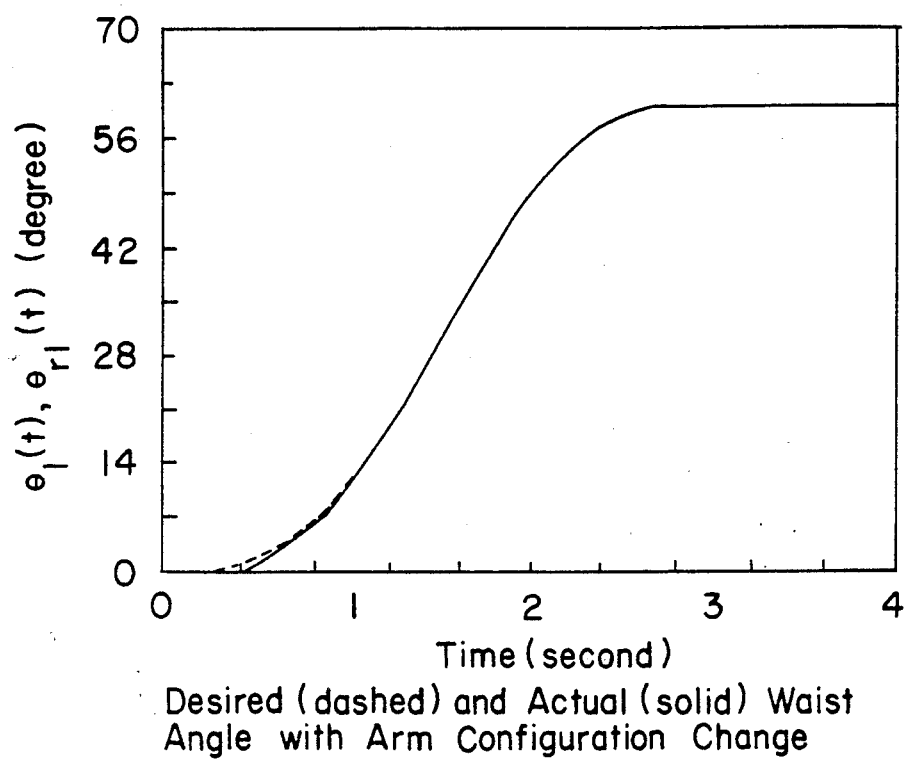
FIG. 12(ii) is a figure depicting the waist tracking-error with arm configuration change in accordance with the invention.
Figure 12:
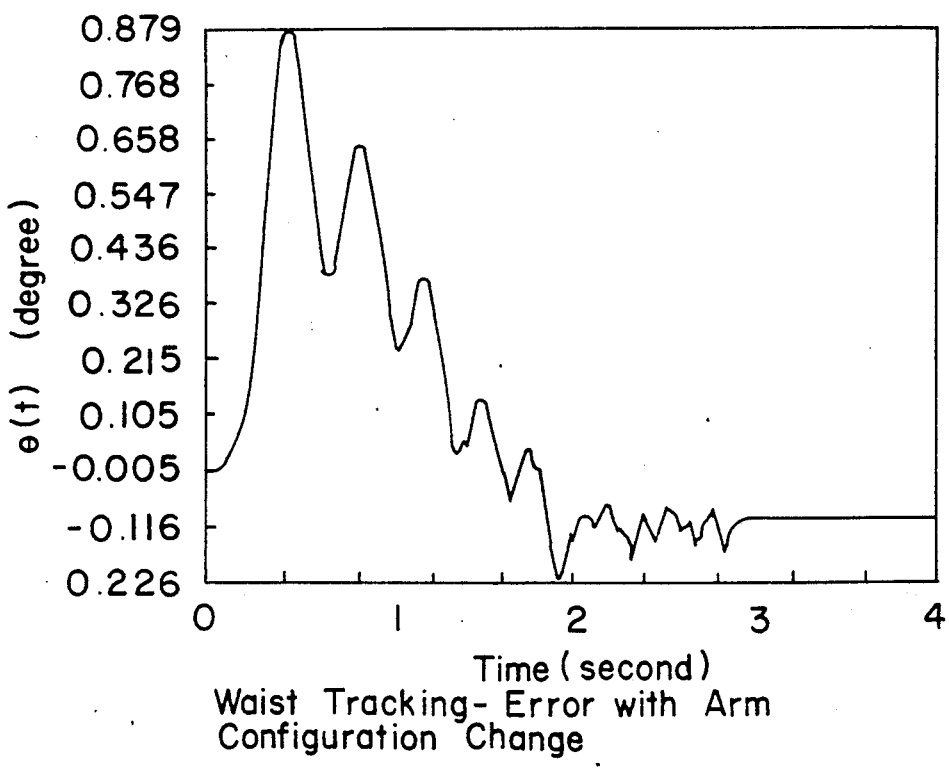

We now specify a different desired trajectory for the waist angle whereby $\theta_1$ is commanded to change from 0 to $$\frac{\pi}{3}$$

in three seconds while tracking a cycloidal trajectory. Using the same adaptive control law (53), the actual recording from the waist joint and the desired trajectory are shown in FIG. 12(i) and the tracking-error is plotted in FIG. 12(ii). It is seen that the actual trajectory tracks the new desired trajectory very closely, despite the dynamic loading on the waist joint and the inter-joint coupling disturbances. The experimental results demonstrate that the invention's control system is not sensitive to the arm configuration, torque disturbances, or the desired trajectory.

The following observations are made from further experiments on the PUMA robot:

1. Using the Unimation controller, the tracking-error increases for fast motion under heavy payload. For instance, when the arm is fully extended horizontally carrying a five pound payload and the waist joint is moved by 90° in 1.2 seconds, the peak joint tracking-error is about 9°. When transformed to the end-effector, this gives the peak tip error of 16 centimeters.

2. The rate of sampling, $T_s$, has a central role in the performance of the proposed control scheme. In the adaptive feedback controller, the sampling rate determines the rate at which the feedback gains and the auxiliary signal are updated. Faster sampling rate (smaller $T_s$) allows higher adaptation rates to be used, which in turn leads to a better tracking performance. When the sampling rate is slow (large $T_s$), the tracking performance is degraded, and the use of high adaptation gains may lead to closed-loop instability. For instance, for $T_s = 14$ msec, the adaptation gains equations (54)-(57) must be reduced to maintain stability, and this degrades the tracking performance. In general, when $T_s$ is large, the effects of sampling and discretization are more pronounced and the control system performance is degraded. Therefore, in practical implementation, it is highly desirable to increase the sampling rate as much as possible by optimizing the real-time control program or using a multi-processor concurrent computing system. In the present experimental setup, for any sampling period $T_s$, about three msec is taken up by the communication between the Micro VAX II and the Unimation controller; hence for $T_s = 7$ msec only four msec is available for control law computations.

3. The feedback adaptation gains in (54)-(57) should not be chosen unnecessarily high, since too high gains can lead to instability while producing negligible improvement in the tracking performance (e.g., an acceptable peak error of 1° may decrease to 0.1°). For instance, for the adaptation gains given in the above experiment, motion of $\theta_1$ by 90° in 1.2 seconds leads to instability. In this case, it is necessary to decrease the adaptation gains or to introduce $\sigma$-modification in order to ensure stability. Therefore, in general, the adaptation gains must be chosen to yield an acceptable tracking performance for the fastest trajectory in the experiment, i.e. "the worst case design".

4. For very slow motions of the waist joint (e.g., average speed of 2°/sec), the friction present in the waist joint has a dominating effect and therefore the implemented control scheme has a poor performance. This is due to the fact that in this case, the control torque $T_c$ is comparable in magnitude to the stiction $T_s$ of the joint, and hence the net torque $T_c - T_s$ applied to the joint is not sufficiently large. Therefore, for slow motions, it is necessary to introduce a feedforward controller or a friction compensation in order to counteract the effect of stiction. The situation is improved by increasing the sampling rate.

8. Conclusions

A new and simple robust control system for accurate trajectory tracking of robotic manipulators has been described. The control system takes full advantage or any known part of the manipulator dynamics in the feedforward controller. The adaptive feedback controller then compensates for any unknown dynamics and uncertainties/variations in the manipulator/payload parameters.

From the tracking point of view, it is desirable to set the feedback adaptation rates as high as possible so that the feedback controller can respond rapidly to variations in the manipulator dynamics or sudden changes in the payload. High rate adaptation, however, can cause instability through the excitation of unmodeled dynamics. The stability is counteracted by the addition of decay terms to the integral adaptation laws to yield an adaptive controller which is robust in the presence of unmodeled dynamics and disturbances.

The feedback adaptation laws in Section 3 are derived under the assumption that the robot model is "slowly time-varying" in comparison with the controller terms. In theory, this assumption is necessary in order to derive simple adaptation laws which do not contain any terms from the robot model. In practice, the simulation and experimental studies of Sections 5 and 6 justify the assumption, even under gross abrupt change in the payload. This is due to the robust nature of adaptive control schemes, which is discussed briefly in H. Seraji, *A New Approach To Adaptive Control of Manipulators,* supra. Nevertheless, further simulations and experiments need to be performed using direct-drive arms in fast motions to test the practical limitations of the simplifying assumption of slow time variation.

Simulation results for a two-link robot and experimental results of a PUMA industrial robot validate the capability of the invention's control system in accurate trajectory tracking with partial or no information on the manipulator dynamics.

Finally, the control features presented herein can readily be extended to the direct control of end-effector position and orientation in Cartesian space. In this formulation, the controllers operate on Cartesian variables and the end-effector control forces are then transformed to joint torques using the Jacobean matrix (H. Seraji, *An Approach To Multivariable Control Of Manipulators,* ASME Journ. Dynamic Systems, Measurement and Control, Vol. 109, No. 2, pp. 146-154, 1987 and H. Seraji, *Direct Adaptive Control Of Manipulators In Cartesian Space,* Journal of Robotic Systems, Vol. 4, No. 1, pp. 157-178, 1987.

The above description presents the best mode contemplated in carrying out my invention. My invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawing.

What is claimed is:

1. A robotic system that combines model-based and performance-based techniques to control a manipulator by a control signal developed in response to input command terms and formed from nominal and complement control-signal components, said system comprising;
   a distinct feedforward circuit means, model-based and containing user-accessible inputs for receiving a priori information concerning the manipulator's dynamics, as input into said feedforward circuit means by an operator of said system, said feedforward circuit means for controlling said manipulator by a nominal signal component delivered by the feedforward circuit means to said manipulator;
   a second feedback circuit means, distinct and separate forms aid feedforward means, performance-based and responding adaptively to actual performance of said controlled manipulator, for emitting a feedback-related signal complement; and
   signal combining means connected to said feedforward and feedback means for combining said feedback-related signal complement with said nominal signal component from said distinct feedforward circuit means in order to form a combined control signal, which combined control signal fully controls said manipulator's performance.

2. A robotic system in accordance with claim 1 wherein desired manipulator position, velocity, and/or acceleration are individual command input terms for the system, and said distinct feedforward circuit means is model-based and contains any known part of the manipulator's dynamics that can be used for on-line control, and said feedforward circuit means further includes;
   computation elements that receive said priori information about the manipulators dynamics as input by the operator and responds to such information and to the desired command input terms for computing partial information for on line control over said manipulator by said nominal signal as developed by said feedforward means.

3. A robotic system that combines model-based and performance-based techniques to control a manipulator by a control signal developed in response to input command terms including desired manipulator position, velocity, and/or acceleration as individual command input terms for the system, and wherein said control signal is formed from nominal and complement control-signal components; said system comprising;
   feedforward circuit means, model-based and containing a priori information concerning the manipulator's dynamics, as input into said feedforward circuit means by an operator of said system, for controlling said manipulator by a nominal signal component delivered by the feedforward circuit means to said manipulator;
   feedback circuit means, performance-based and responding to actual performance of said controlled manipulator, for emitting a feedback related signal complement which combines with said nominal signal component from said feedforward circuit means in order to form a combined control signal, which combined control signal controls said manipulator's performance;
   and said feedforward circuit means further includes;
   computation elements that receive said priori information about the manipulators dynamics as input by said operator and responds to such information and to the desired command input terms for computing partial information for on-line control over said manipulator by said nominal signal as developed by said feedforward means; and
   an actuator for said manipulator, and wherein the manipulator-plus-actuator has a given configuration, speed of motion, and a payload mass which is expressed as integrated dynamic model defined as;

$$M(m,\theta)\ddot{\theta} + N(m,\theta,\dot{\theta}) = V$$

wherein the above-noted terms are defined as $$M(m,\theta) = G + EM^*(m,\theta);$$
$$N(m,\theta,\dot{\theta}) = C\dot{\theta} + EN^*(m,\theta,\dot{\theta})$$

and m is the payload mass, $M^*(m,\theta)$ is the symmetric positive-definite $n \times n$ inertia matrix, $N^*(m,\theta,\dot{\theta})$ is the $n \times 1$ vector representing the total torque due to Coriolis and centrifugal term, gravity loading term, and frictional term, and the elements of $M^*$ and $N^*$ are highly coalex nonlinear functions which depend upon the configuration $\theta$, the speed of motion $\dot{\theta}$, and, G and C respectively, are the inertia term and damping term for the payload mass m of said manipulator-plus-actuator.

4. A control system in accordance with claim 3 wherein said manipulator has control joints and said system has an adaptation control law, and is further characterized in that;
   said adaptation control law is decentralized with variable gains $\{K_p(t), K_v(t)\}$, being defined as diagonal matrices and the ith diagonal elements of said diagonal matrices being obtained from said adaptation law, with an error feedback voltage e(t) replaced by $e_i(t)$, as follows:

$$f(t) = \gamma_1 \dot{r}(t) + \gamma_2 r(t)$$

$$\dot{K}_p(t) = \alpha_1 \frac{d}{dt}[r(t)e'(t)] + \alpha_2[r(t)e'(t)]$$

$$\dot{K}_v(t) = \beta_1 \frac{d}{dt}[r(t)\dot{e}(t)] + \beta_2[r(t)\dot{e}(t)]$$

wherein the prime denotes transposition, and r(t) is the $n \times 1$ vector of "weighted" position-velocity error defined as $r(t) = W_p e(t) + W_v \dot{e}(t)$, and $\{\gamma_i, \alpha_1, \beta_1\}$ are zero or positive proportional adaptation gains, $\{\gamma_2, \alpha_2, \beta_2\}$ are positive integral adaptation gains, and $W_p = \text{diag}_i(W_{pi})$ and $W_v + \text{diag}_1(W_{vi})$ are constant $n \times n$ matrices which contain the position and velocity weighting factors for all said control joints in the manipulator being controlled.

5. A method of robotic control in which an on-line control over a manipulator has been initially established by a model-based control signal, the improvement comprising the steps of
   complementing said model-based control signal with another signal developed by a feedback circuit means;
   developing error signals each indicating the difference between the desired and actual manipulator velocity and position, with each error signal subject to an adaptation law which includes variable gain for each error signal in order to develop said complement signal component; and expressing said adaptation law as r(t) which is the n×1 vector of "weighted" position-velocity error defined by:

$$r(t) = W_p e(t) + W_v \dot{e}(t)$$

$$f(t) - f(0) = \gamma_1[r(t) - r(0)] + \gamma_2 \int_0^t r(t)dt$$

$$K_p(t) - K_p(0) = \alpha_1[r(t)e'(t) - r(0)e'(0)] + \alpha_2 \int_0^t r(t)e'(t)dt$$

$$K_v(t) - K_v(0) = \beta_1[r(t)\dot{e}'(t) - r(0)\dot{e}'(0)] + \beta_2 \int_0^t r(t)\dot{e}'(t)dt$$

and wherein $\{\gamma_1, \alpha_1, \beta_1\}$ are zero or positive proportional adaptation gains, $\{\gamma_2, \alpha_2, \beta_2\}$ are positive integral adaptation gains, and $W_p = \text{diag}_i(W_{pi})$ and $W_v = \text{diag}_i(W_{vi})$ are constant n×n matrices which contain the position and velocity weighting factors for all joints of said manipulator.

6. Formulating, in hardware, a control system apparatus which operates in accordance with the method steps of claim 5 and performing the further method steps of;

integrating the equations of claim 5 in the time interval [0,], to obtain $$f(t) - f(0) = \gamma_1[r(t) - r(0)] + \gamma_2 \int_0^t r(t)dt$$

$$K_p(t) - K_p(0) = \alpha_1[r(t)e'(t) - r(0)e'(0)] + \alpha_2 \int_0^t r(t)e'(t)dt$$

$$K_v(t) - K_v(0) = \beta_1[r(t)\dot{e}'(t) - r(0)\dot{e}'(0)] + \beta_2 \int_0^t r(t)\dot{e}'(t)dt$$

noting that the initial values of the reference and actual trajectories are the same, that is $$e(0) = \dot{e}(0) = r(0) = 0, \text{ and}$$

establishing a Proportional + integral (P+I) adaptation law for improved control over said manipulator.

7. The method of claim 6 and comprising the further steps of:
affecting all adaptation rates simultaneously; and
individually affecting the adaptation rate for each term $\{f(t), K_p(t), K_v(t)\}$ by selecting $\{\gamma_1, \alpha_1, \beta_1\}$ independently for improved control over said manipulator.

8. The method of claim 7 comprising the further step of:
increasing the rate of convergence of the tracking-error e(t) to zero.

9. In a controller having a control signal which controls a manipulator's position and velocity in Cartesian space, wherein the manipulator and environment form a system exhibiting nonlinear dynamics and system parameters which may not be fully known to an operator and wherein the controller includes an adaptive feedback servo control loop which senses actual position and velocity of said manipulator being controlled in Cartesian space, the improvement comprising:

manipulator driving means responsive to said control signal for driving said manipulator in said environment to achieve, in Cartesean space, a desired position, velocity, and acceleration as indicated by said control signal;

a model-based feedforward loop outside of said adaptive servo control loop that allows the operator to provide a nominal signal to the manipulator based upon a limited amount of knowledge concerning the manipulator and/or the system which the operator may elect to input into said system; and adaptive control means in said feedback servo control loop, responsive to said sensed position and velocity, for varying said control signal applied to said manipulator's driving means, which variable control signal compensates in real-time for the system's nonlinearities as said manipulator is driven in Cartesean space to a controlled position and velocity.

10. A control system in accordance with claim 9 and further wherein the system operates in real-time control with a given sampling rate, and said system further comprises;

a feedforward computational element connected in said feedforward loop for receiving operator-input values concerning said manipulator and/or system's dynamics in order to develop a nominal signal that is applied to said control signal for said manipulator independently of said adaptive controlling means.

11. In a controller having a control signal which controls a manipulator's position and velocity in Cartesean space, wherein the manipulator and its environment form a system exhibiting nonlinear dynamics and system parameters which may not be fully known to an operator, and wherein the controller includes an adaptive feedback servo control loop which senses actual position and velocity of said manipulator being controlled in Cartesian space, the improvement comprising:

manipulator driving means responsive to said control signal for driving said manipulator in said environment to achieve, in Cartesian space, a desired position, velocity, and acceleration as indicated by said control signal;

a model-based feedforward loop separate and distinct from said adaptive servo control loop that allows the operator to provide a nominal signal to the manipulator based upon a limited amount of knowledge concerning the manipulator and/or the system which the operator may elect to input into said system;

adaptive control means in said feedback servo control loop, responsive to said sensed position and velocity, for varying said control signal applied to said manipulator's driving means, which variable control signal compensates in real-time for the system's nonlinearities as said manipulator is driven in Cartesean space to a controlled position and velocity;

and further wherein the system operates in real-time control with a given sampling rate, and said system further comprises;

a feedforward computational element connected in said feedforward loop for receiving operator-input values concerning said manipulator and/or system's dynamics in order to develop a nominal signal that is applied to said control signal for said manipulator independently of said adaptive controlling means in said separate and distinct feedback control loop; and said adaptive control means operates in accordance with a control law which may be considered as though it was applied directly to the manipulator's end effector in Cartesian space, and said controller further comprises:

means connected in a force feedforward control loop for receiving a feedforward signal representing a desired mathematical term for said manipulator;

an adaptive proportional-integral-differential (PID) controller in said feedback control loop; and a plurality of variable gain circuits for implementing a control law characterized as an adaptive feedback controller described by $$V_a(t) = f(t) + K_p(t)e(t) + K_v(t)\dot{e}(t)$$

where $V_a(t)$ is the $n \times 1$ adaptive control voltage vector, $e(t) = \theta_r(t) - \theta(t)$ is then $n \times 1$ position tracking-error vector, $f(t)$ is an $n \times 1$ auxiliary signal generated by the adaptation scheme, and $\{K_p(t), K_v(t)\}$ are $n \times n$ adjustable PD feedback gain matrices.

12. A combined model-based and performance-based robotic control system that generates a combined control signal developed from nominal and complement signal components, comprising;
   first distinct means, model-based and containing a priori information known by an operator concerning a manipulator's dynamics, connected in a separate and distinct feedforward circuit for developing said nominal signal component; and
   adaptive control means, also separate and distinct from said first means, performance-based and responding adaptively to actual performance of said controlled manipulator, for combining said complement signal generated by said adaptive control means with said nominal signal as developed by said first means so that the combined signal ultimately has full control over said manipulator.

13. A control system in accordance with claim 12 which exhibits noise in the form of destabilization in the control system, which noise is compensated for by a $\sigma$-modified law, and wherein said system is further characterized in that:
   said noise is compensated for in the feedback means by said $\sigma$-modified control law that is expressed by:

$$\dot{K}(t) = -\sigma K(t) + \mu_1 \frac{d}{dt}[r(t)s'(t)] + \mu_2[r(t)s'(t)]$$

where $\sigma$ is a positive scalar design parameter.

14. A control system in accordance with claim 12 and further wherein the size of $\sigma$ reflects a lack of knowledge about the unmodeled dynamics and disturbances of the manipulator system, and further wherein said system is characterized in that
   the leakage or decay term $-\sigma K(t)$ acts to dissipate an integral buildup, and to eliminate the drift problem which leads to instability, and $\|r(t)\|$ converges to a bounded non-zero residual set.

15. A control system in accordance with claim 12 in which said control system includes a Proportional+Integral+Sigma $(P+I+\sigma)$ adaptation law for said feedback controller, which law operates in continuous time, as given by:

$$f(t) = f(0) + \gamma_1 r(t) + \gamma_2 \int_0^t r(t)dt - \sigma_1 \int_0^t f(t)dt$$

$$K_p(t) = K_p(0) + \alpha_1 r(t)e'(t) + \alpha_2 \int_0^t r(t)e'(t)dt - \sigma_2 \int_0^t K_p(t)dt$$

$$K_v(t) = K_v(0) + \beta_1 r(t)\dot{e}'(t) + \beta_2 \int_0^t r(t)\dot{e}'(t)dt - \sigma_3 \int_0^t K_v(t)dt$$

where $\{\sigma_1, \sigma_2, \sigma_3\}$ are positive scalar design parameters.

16. A control system in accordance with claim 13 and further characterized by a digital control implementation with sampling period $T_s$, which yields the recursive adaptation laws $$f(N) = \left[\frac{1 - \sigma_1 \frac{T_s}{2}}{1 + \sigma_1 \frac{T_s}{2}}\right] f(N-1) +$$

$$\left[\frac{\gamma_2 \frac{T_s}{2} - \gamma_1}{1 + \sigma_1 \frac{T_s}{2}}\right] r(N-1) + \left[\frac{\gamma_2 \frac{T_s}{2} \gamma_1}{1 + \sigma_1 \frac{T_s}{2}}\right] r(N)$$

$$K_p(N) = \left[\frac{1 - \sigma_2 \frac{T_s}{2}}{1 + \sigma_2 \frac{T_s}{2}}\right] K_p(N-1) +$$

$$\left[\frac{\alpha_2 \frac{T_s}{2} - \alpha_1}{1 + \sigma_2 \frac{T_s}{2}}\right] r(N-1)e'(N-1) +$$

$$\left[\frac{\alpha_2 \frac{T_s}{2} - \alpha_1}{1 + \sigma_2 \frac{T_s}{2}}\right] r(N)e'(N)$$

$$K_v(N) = \left[\frac{1 - \sigma_3 \frac{T_s}{2}}{1 + \sigma_3 \frac{T_s}{2}}\right] K_v(N-1) +$$

$$\left[\frac{\beta_2 \frac{T_s}{2} - \beta_1}{1 + \sigma_3 \frac{T_s}{2}}\right] r(N-1)\dot{e}'(N-1) +$$

$$\left[\frac{\beta_2 \frac{T_s}{2} - \beta_1}{1 + \sigma_3 \frac{T_s}{2}}\right] r(N)\dot{e}'(N)$$

17. A combined model-based and performance-based robotic control system that generates a combined control signal developed from nominal and complement signal components and which exhibits noise in the form of destabilization in the control system, which noise is compensated for by $\sigma$-modified law, and wherein said system is characterized in that:

means, model-based and containing a priori information known by an operator concerning a manipulator's dynamic, connected in a feedback circuit for developing said nominal signal component;

adaptive control means, performance-based and responding adaptively to actual performance of said controlled manipulator, for combining said complement signal generated by said adaptive control means with said nominal signal so that the combined signal controls said manipulator; and noise compensating means in the feedback means including said $\sigma$-modified control law that is expressed by:

$$\dot{K}(t) = -\sigma K(t) + \mu_1 \frac{d}{dt}[r(t)s'(t)] + \mu_2[r(t)s'(t)]$$

where $\sigma$ is a positive scalar design parameter, $\mu 1$ and $\mu 2$ are scalar adaptation gains, r is the weighted tracking error, s' is the transportation of s, where s stands for the signal on which k is acting.

18. A control system in accordance with claim 17 and further wherein the size of $\sigma$ reflects a lack of knowledge about the unmodeled dynamics and disturbances of the manipulator system, and further wherein said system is characterized in that a leakage or decay term $-\sigma K(t)$ acts to dissipate an integral buildup, and to eliminate the drift problem which leads to instability, and $\|r(t)\|$ converges to a bounded non-zero residual set.

19. A control system in accordance with claim 17 in which said control system includes a Proportional+Integral+Sigma(P+I+$\sigma$) adaptation law for said feedback controller, which law operates in continuous time, as given by:

$$f(t) = f(0) + \gamma_1 r(t) + \gamma_2 \int_0^t r(t)dt - \sigma_1 \int_0^t f(t)dt$$

$$K_p(t) = K_p(0) + \alpha_1 r(t)e'(t) + \alpha_2 \int_0^t r(t)e'(t)dt - \sigma_2 \int_0^t K_p(t)dt$$

$$K_v(t) = K_v(0) + \beta_1 r(t)\dot{e}(t) + \beta_2 \int_0^t r(t)\dot{e}(t)dt - \sigma_3 \int_0^t K_v(t)dt$$

where $\{\sigma_1, \sigma_2, \sigma_3\}$ are positive scalar design parameters.

* * * * *